(12) United States Patent
Diachina et al.

(10) Patent No.: US 10,712,423 B2
(45) Date of Patent: *Jul. 14, 2020

(54) ASSIGNMENT MESSAGES ACKNOWLEDGING ACCESS ATTEMPT WITHOUT ASSIGNING RESOURCES

(71) Applicant: TELEFONAKTIEBOLAGET LM ERICSSON (PUBL), Stockholm (SE)

(72) Inventors: John Walter Diachina, Garner, NC (US); Nicklas Johansson, Brokind (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/538,565

(22) Filed: Aug. 12, 2019

(65) Prior Publication Data

US 2020/0041608 A1 Feb. 6, 2020

Related U.S. Application Data

(63) Continuation of application No. 15/887,782, filed on Feb. 2, 2018, now Pat. No. 10,379,199.

(Continued)

(51) Int. Cl.
*H04W 24/02* (2009.01)
*G01S 5/06* (2006.01)
(Continued)

(52) U.S. Cl.
CPC .............. *G01S 5/06* (2013.01); *G01S 5/0252* (2013.01); *H04W 24/02* (2013.01); *H04W 56/0045* (2013.01); *H04W 64/00* (2013.01); *H04W 64/003* (2013.01); *H04W 74/008* (2013.01); *G08C 2201/50* (2013.01);
(Continued)

(58) Field of Classification Search
CPC .... G01S 5/06; G01S 5/0252; H04W 56/0045; H04W 64/00; H04W 74/008; H04W 64/003; H04W 24/02; H04W 52/0212; H04W 56/00; H04W 72/04; H04W 76/27; G08C 2201/50

See application file for complete search history.

(56) References Cited

U.S. PATENT DOCUMENTS

2004/0062211 A1   4/2004   Uhlik
2010/0317351 A1   12/2010   Gerstenberger et al.
(Continued)

FOREIGN PATENT DOCUMENTS

EP   2595436 A1   5/2013
RU   2517389 C2   5/2014
(Continued)

OTHER PUBLICATIONS

Ericsson LM et al., "New Work Item on Positioning Enhancements for GERAN", RP-161260, RAN#72, Jun. 13-16, 2016, the whole document.

(Continued)

*Primary Examiner* — Chuong A Ngo

(57) ABSTRACT

A mobile station (MS), a base station subsystem (BSS), and various methods are described herein that enable the MS to receive acknowledgement of an access attempt for performing a multilateration timing advance (MTA) procedure using the Access Burst method without also being assigned resources.

18 Claims, 20 Drawing Sheets

Related U.S. Application Data

(60) Provisional application No. 62/453,840, filed on Feb. 2, 2017, provisional application No. 62/475,369, filed on Mar. 23, 2017, provisional application No. 62/477,806, filed on Mar. 28, 2017.

(51) Int. Cl.
   *H04W 64/00* (2009.01)
   *G01S 5/02* (2010.01)
   *H04W 56/00* (2009.01)
   *H04W 74/00* (2009.01)
   *H04W 52/02* (2009.01)

(52) U.S. Cl.
   CPC ......... *H04W 52/0212* (2013.01); *Y02D 70/10* (2018.01); *Y02D 70/12* (2018.01); *Y02D 70/122* (2018.01); *Y02D 70/124* (2018.01); *Y02D 70/126* (2018.01); *Y02D 70/1224* (2018.01); *Y02D 70/1226* (2018.01); *Y02D 70/1242* (2018.01); *Y02D 70/1262* (2018.01); *Y02D 70/146* (2018.01); *Y02D 70/20* (2018.01); *Y02D 70/21* (2018.01)

(56) References Cited

U.S. PATENT DOCUMENTS

| | | |
|---|---|---|
| 2011/0222476 A1 | 9/2011 | Hole et al. |
| 2018/0192387 A1 | 7/2018 | Jung et al. |

FOREIGN PATENT DOCUMENTS

| | | | | |
|---|---|---|---|---|
| WO | 2013/150344 A1 | 10/2013 | | |
| WO | 2016/154944 A1 | 10/2016 | | |
| WO | WO-2018033260 A1 | * | 2/2018 | ............ H04W 64/00 |

OTHER PUBLICATIONS

Ericsson LM, "Positioning Enhancements for GERAN—introducing TA trilateration", RP-161034, RAN#72, Jun. 13-16, 2016, the whole document.

Ericsson LM, "On timing advance based multi-leg positioning for NB-IoT", R1-167426, RAN1#86, Aug. 22-26, 2016, the whole document.

3GPP TS 45.010 V13.3.0, "GSM/EDGE Radio subsystem synchronization", Sep. 2016, the whole document.

Motorola, "Cubic Metric in 3GPP-LTE", R1-060385, RAN1#44, Feb. 13-17, 2006, the whole document.

3GPP TS 45.003 V14.0.0, 3rd Generation Partnership Project; Technical Specification Group Radio Access Network; GSM/EDGE Channel coding (Release 14), dated Dec. 2016, p. 303.

Nokia, "Extended Access Burst for TA estimation", R6-160234, RAN WG6 #2, Nov. 14-18, 2016; pp. 1-8.

Ericsson LM, "Multilateration Procedure—TA Only" R6-160261, RAN WG6 Meeting #2, Nov. 14-18, 2016; .pp. 1-44.

Nokia, "Radio Interface Enhancements for TA based multilateration (update of R6-160195)", 3GPP TSG RAN WG6 #2, R6-160233, Reno, Nevada, U.S.A., Nov. 14-18, 2016; pp. 1-6.

Nokia, "Extended Access Burst for TA estimation (update of R6-160196)", R6-160205, 3GPP TSG RAN WG6 #2, Reno, Nevada, U.S.A., Nov. 14-18, 2016; pp. 1-7.

LM Ericsson, "Muttilateration Procedure—TA Only", R6-160273 (revision of R6-160261), RAN WG6 Meeting #2, Nov. 14-18, 2016, Reno, Nevada USA; pp. 1-50.

3GPP TS 44.018 V15.1.0 (Dec. 2017), 3rd Generation Partnership Project; Technical Specification Group Radio Access Network; Mobile radio interface layer 3 specification; GSM/EDGE Radio Resource Control (RRC) protocol (Release 15), Jan. 17, 2018; pp. 1-560.

* cited by examiner

FIG. 3A

Table 9.1.18.1 (3GPP TS 44.018): IMMEDIATE ASSIGNMENT message content

| IEI | Information element | Type / Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | 1/2 |
| | Skip Indicator | Skip Indicator 10.3.1 | M | V | 1/2 |
| | Immediate Assignment Message Type | Message Type 10.4 | M | V | 1 |
| | Page Mode | Page Mode 10.5.2.26 | M | V | 1/2 |
| | Dedicated mode or TBF | Dedicated mode or TBF 10.5.2.25b | M | V | 1/2 |
| | Channel Description | Channel Description 10.5.2.5 | C | V | 3 |
| | Packet Channel Description | Packet Channel Description 10.5.2.25a | C | V | 3 |
| | Request Reference | Request Reference 10.5.2.30 | M | V | 3 |
| | Timing Advance | Timing Advance 10.5.2.40 | M | V | 1 |
| | Mobile Allocation | Mobile Allocation 10.5.2.21 | M | LV | 1-9 |
| 7C | Starting Time | Starting Time 10.5.2.38 | O | TV | 3 |
| | IA Rest Octets | IA Rest Octets 10.5.2.16 | M | V | 0-11 |
| 6D | Extended TSC Set | Extended TSC Set 10.5.2.82 | O | TV | 2 |

FIG. 3B

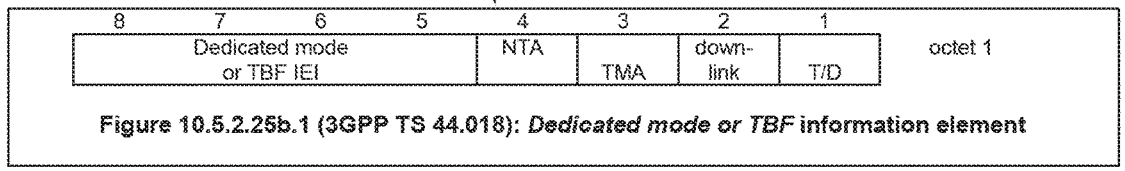

Figure 10.5.2.25b.1 (3GPP TS 44.018): *Dedicated mode or TBF* information element

FIG. 3C

Table 10.5.2.25b.1 (3GPP TS 44.018): *Dedicated mode or TBF* information element T/D : TBF or dedicated mode (octet 1, bit 1)
The coding of this field is given by Table 10.5.2.2.25b.2.

Downlink : Downlink TBF assignment to the mobile station identified in the IA Rast Octets IE (octet 1, bit 2)
The coding of this field is given by Table 10.5.2.2.25b.2.

TMA : Two-message assignment (octet 1, bit 3)
The coding of this field is given by Table 10.5.2.2.25b.2.

NTA (No TBF Allocated): This field is used to indicate when no TBF is allocated by the IMMEDIATE ASSIGNMENT message (octet 1, bit 4). The coding of this field is given by Table 10.5.2.2.25b.2. If this field is set to '1' the mobile station shall ignore the contents of Channel Description IE, Packet Channel Description IE, Timing Advance IE, Mobile Allocation IE, Starting Time IE, IA Rest Octets IE and Extended TSC Set IE if included in the IMMEDIATE ASSIGNMENT message.

FIG. 3D

Table 10.5.2.25b.2 (3GPP TS 44.018): *Dedicated mode or TBF* information element: T/D, downlink and TMA fields

| NTA bit 4 | TMA bit 3 | downlink bit 2 | T/D bit 1 | Description |
|---|---|---|---|---|
| 0 | 0 | 0 | 0 | This message assigns a dedicated mode resource |
| 0 | 0 | 1 | 0 | Not used (Note 1) |
| 0 | 1 | 0 | 0 | Not used (Note 1) |
| 0 | 1 | 1 | 0 | Not used (Note 1) |
| 0 | 0 | 0 | 1 | This message assigns an uplink TBF or is the second message of two in a two-message assignment of an uplink or downlink TBF |
| 0 | 0 | 1 | 1 | This message assigns a downlink TBF to the mobile station identified in the IA Rest Octets IE |
| 0 | 1 | 0 | 1 | This message is the first message of two in a two-message assignment of an uplink TBF |
| 0 | 1 | 1 | 1 | This message is the first message of two in a two-message assignment of a downlink TBF to the mobile station identified in the IA Rest Octets IE |
| 1 | x | x | x | When the IMMEDIATE ASSIGNMENT message is sent in response to an EGPRS MULTILATERATION REQUEST message indicating the "Access Burst" method (see sub-clause 9.1.18 and sub-clause 3.11) the NTA bit shall be set to '1'. |

NOTE 1: The code point is not used. The behaviour of the mobile station is not defined. The code point should not be used in future versions of the protocol.

10.5.2.16 (3GPP TS 44.018): IA Rest Octets coding (sent to an MS performing MTA Procedure using Access Burst Method according to option 1 or option 2)

```
| LH
    {      00       < EGPRS Packet Uplink Assignment >
         | 01       < Multiple Blocks Packet Downlink Assignment >
         | 1        -- reserved for future use (however the value 7C for the first octet shall not be used)
    }
    { null   | L    -- Receiver compatible with earlier release
             | H    -- Additions in Release 13
             < Implicit Reject PS : bit >
             < PEO_BCCH_CHANGE_MARK : bit (2) >
             < RCC : bit (3) >
    }
```

FIG. 3F

Table 9.1.18.1x (3GPP TS 44.018): IMMEDIATE ASSIGNMENT message content (sent to an MS performing MTA Procedure using Access Burst Method according to option 1)

| IEI | Information element | Type / Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | 1/2 |
| | Skip Indicator | Skip Indicator 10.3.1 | M | V | 1/2 |
| | Immediate Assignment Message Type | Message Type 10.4 | M | V | 1 |
| | Page Mode | Page Mode 10.5.2.26 | M | V | 1/2 |
| | Dedicated mode or TBF | Dedicated mode or TBF 10.5.2.25b | M | V | 1/2 |
| | Request Reference | Request Reference 10.5.2.30 | M | V | 3 |
| | Timing Advance | Timing Advance 10.5.2.40 | M | V | 1 |
| | Mobile Allocation | Mobile Allocation 10.5.2.21 | M | LV | 1-9 |
| | IA Rest Octets | IA Rest Octets 10.5.2.16 | M | V | 0-11 |
| | Request Reference 2 | Request Reference 10.5.2.30 | M | V | 3 |
| | Request Reference 3 | Request Reference 10.5.2.30 | M | V | 3 |
| | Request Reference 4 | Request Reference 10.5.2.30 | M | V | 3 |

FIG. 3G

Table 9.1.18.1x (3GPP TS 44.018): IMMEDIATE ASSIGNMENT message content (sent to an MS performing MTA Procedure using Access Burst Method according to option 2)

| IEI | Information element | Type / Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | 1/2 |
| | Skip Indicator | Skip Indicator 10.3.1 | M | V | 1/2 |
| | Immediate Assignment Message Type | Message Type 10.4 | M | V | 1 |
| | Page Mode | Page Mode 10.5.2.26 | M | V | 1/2 |
| | Dedicated mode or TBF | Dedicated mode or TBF 10.5.2.25b | M | V | 1/2 |
| | Packet Channel Description | Packet Channel Description 10.5.2.25a | M | V | 3 |
| | Request Reference | Request Reference 10.5.2.30 | M | V | 3 |
| | Timing Advance | Timing Advance 10.5.2.40 | M | V | 1 |
| | Mobile Allocation | Mobile Allocation 10.5.2.21 | M | LV | 1-9 |
| | IA Rest Octets | IA Rest Octets 10.5.2.16 | M | V | 0-11 |
| | Request Reference 2 | Request Reference 10.5.2.30 | M | V | 3 |
| | Request Reference 3 | Request Reference 10.5.2.30 | M | V | 3 |
| | Request Reference 4 | Request Reference 10.5.2.30 | M | V | 3 |

FIG. 4

Table 10.5.2.25b.2 (3GPP TS 44.018): *Dedicated mode or TBF* information element:
T/D, downlink and TMA fields

410

| TMA bit 3 | downlink bit 2 | T/D bit 1 | Description |
|---|---|---|---|
| 0 | 0 | 0 | This message assigns a dedicated mode resource |
| 0 | 1 | 0 | This message is sent when the IMMEDIATE ASSIGNMENT message is sent in response to an EGPRS MULTILATERATION REQUEST message indicating the "Access Burst" method (see sub-clause 9.1.18 and sub-clause 3.11) |
| 1 | 0 | 0 | Not used (Note 1) |
| 1 | 1 | 0 | Not used (Note 1) |
| 0 | 0 | 1 | This message assigns an uplink TBF or is the second message of two in a two-message assignment of an uplink or downlink TBF |
| 0 | 1 | 1 | This message assigns a downlink TBF to the mobile station identified in the IA Rest Octets IE |
| 1 | 0 | 1 | This message is the first message of two in a two-message assignment of an uplink TBF |
| 1 | 1 | 1 | This message is the first message of two in a two-message assignment of a downlink TBF to the mobile station identified in the IA Rest Octets IE |
| NOTE 1: The code point is not used. The behaviour of the mobile station is not defined. The code point should not be used in future versions of the protocol. | | | |

FIG. 5A

Table 9.1.XX.1 (3GPP TS 44.018): IMMEDIATE ASSIGNMENT TYPE 2 message content

| IEI | Information element | Type / Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | 1/2 |
| | Skip Indicator | Skip Indicator 10.3.1 | M | V | 1/2 |
| | Immediate Assignment Message Type | Message Type 10.4 | M | V | 1 |
| | Page Mode | Page Mode 10.5.2.26 | M | V | 1/2 |
| | Short ID | Short ID 10.5.2.xx | M | V | 1 |

FIG. 5B

Table XXX: *Short ID* information element

Short ID (8 bit field)

This field identifies a cell specific 8 bit Short ID value used by a MS performing the MTA procedure using the Access Burst method (see sub-clause 3.11). The Short ID value used by a MS in a given cell is pre-determined (selected by the SMLC and included as part of cell specific assistance information applicable to the Multilateration Timing Advance procedure – see 3GPP TS 44.031). It allows the BSS managing a cell in which it receives an EGPRS MULTILATERATION REQUEST message containing a Short ID field to identify the applicable SCCP connection between the BSS and the serving SMLC (see 3GPP TS 49.031 and 3GPP TS 44.031).

FIG. 6A

Table 9.1.18b.1 (3GPP TS 44.018): IMMEDIATE PACKET ASSIGNMENT message content

| IEI | Information element | Type / Reference | Presence | Format | length |
|---|---|---|---|---|---|
| | L2 Pseudo Length | L2 Pseudo Length 10.5.2.19 | M | V | 1 |
| | RR management Protocol Discriminator | Protocol Discriminator 10.2 | M | V | 1/2 |
| | Skip Indicator | Skip Indicator 10.3.1 | M | V | 1/2 |
| | Immediate Packet Assignment Message Type | Message Type 10.4 | M | V | 1 |
| | Page Mode | Page Mode 10.5.2.26 | M | V | 1/2 |
| | Feature Indicator | Feature Indicator 10.5.2.76 | M | V | 1/2 |
| | IPA Rest Octets | IPA Rest Octets 10.5.2.78 | M | V | 19 |

**Table 10.5.2.78.1 (3GPP 44.018): *IPA Rest Octets* information element**

```
<IPA Rest Octets> ::=
        { 0 | 1     < IPA Uplink Assignment struct >}
        { 0 | 1     < IPA Downlink Assignment struct >}
        { 0 | 1     < IPA Single Block Uplink Assignment struct >}
    {   null        | L               -- Receiver compatible with earlier release
                    | H               -- Additions in Release 13
                        < RCC : bit (3) >
    }
    {   null        | L               -- Receiver compatible with earlier release
                    | H               -- Additions in Release 14
                        < Short ID 1 : bit (8) >
                        { 0 | 1 < Short ID 2 : bit (8) > }
                        { 0 | 1 < Short ID 3 : bit (8) > }
                        { 0 | 1 < Short ID 4 : bit (8) > }
    }
        <spare padding>;

<IPA Uplink Assignment struct> ::=
        { 1     < Random Reference : bit (11) >
                < FN_OFFSET: bit (8) >
                < GAMMA : bit (5) >
                < TIMING_ADVANCE_VALUE : bit (6) >
                < TFI_ASSIGNMENT : bit (5) >
                < USF: bit (3) >
                < EGPRS_CHANNEL_CODING_COMMAND : bit (4) >
                < Radio Access Capabilities Request: bit (1) >
        } ** 0;                       --Repeated as many times as necessary, once for each
addressed device
                < TN : bit (3) >
                { 0     ;             --'0' indicates that BCCH frequency shall be used
                | 1     {< Frequency Parameters: Frequency Parameters struct >}
                }

< IPA Downlink Assignment struct> ::=
        { 1     < TLLI : bit (32) >
                < TFI_ASSIGNMENT : bit (5) >
                < GAMMA : bit (5) >
                { 0 | 1 < TIMING_ADVANCE_VALUE : bit (6) > }
        } ** 0;                       --Repeated as many times as necessary, limited by the
space in the message
                { 0 | 1 < LINK_QUALITY_MEASUREMENT_MODE: bit (2) > }
                < RLC_MODE : bit >
                < TN : bit (3) >
                { 0     ;             --'0' indicates that BCCH frequency shall be used
                | 1     {< Frequency Parameters: Frequency Parameters struct >}
                }

<IPA Single Block Uplink Assignment struct> ::=
        { 1     < Random Reference : bit (11) >
                < FN_OFFSET: bit (8) >
                < GAMMA : bit (5) >
                < TIMING_ADVANCE_VALUE : bit (6) >
                < STARTING_TIME_OFFSET: bit (6) >,
        } ** 0;                       --Repeated as many times as necessary, limited by the
space in the message
                < TN : bit (3) >
                { 0     ;             --'0' indicates that BCCH frequency shall be used
                | 1     {< Frequency Parameters: Frequency Parameters struct >}
                }
```

FIG. 6C

**Table 10.5.2.78.2 (3GPP TS 44.018): *IPA Rest Octets* information element details**

*IPA Uplink Assignment struct*

The Random Reference field (11 bit field) is the 11 bits of the EGPRS PACKET CHANNEL REQUEST message.

The FN_OFFSET field (8 bit field) is a negative offset added to the first FN of this received IMMEDIATEE PACKET ASSIGNEMENT message which indicates the frame number where the MS sending the EGPRS PACKET CHANNEL REQUEST message. Range: - 255to 0.

The GAMMA field (5 bit field) is the binary representation of the parameter ΓCH for MS output power control in units of 2 dB, see 3GPP TS 45.008. The GAMMA field is coded according to the following table:

bit
5 4 3 2 1
0 0 0 0 0 ΓCH = 0 dB
0 0 0 0 1 ΓCH = 2 dB
: : : :
1 1 1 1 0 ΓCH = 60 dB
1 1 1 1 1 ΓCH = 62 dB The TIMING_ADVANCE_VALUE field (6 bit field) is the binary representation of the timing advance in bit periods and encoded the same as the value of the Timing Advance information element defined in sub-clause 10.5.2.40. Range: 0 to 63.

The TFI_ASSIGNMENT field (5 bit field) is the binary representation of the Temporary Flow Identity, see 3GPP TS 44.060. Range: 0 to 31.

The USF field (3 bit field) is the binary representation of the uplink state flag, see 3GPP TS 44.060. Range: 0 to 7.

The EGPRS_CHANNEL_CODING_COMMAND field (4 bit field) indicates the channel coding command that the mobile station shall use for any RLC data block regardless a TLLI field contained or not, and is defined in sub-clause 12.10d, 3GPP TS44.060.

The Radio Access Capabilities Request field (1 bit field) indicates the request of MS Radio Access Capability by the network for the addressed MSs in this message.

0    MS Radio Access Capability is not requested by the network;
1    MS Radio Access Capability for the BCCH band is requested by the network.

The TN field (3 bit field) is the binary representation of the timeslot number as defined in 3GPP TS 45.010. Range: 0 to 7.

Frequency Parameters IE

This information element is defined in sub-clause 12.8, 3GPP TS44.060.

The EGPRS Window Size parameter is not included, and default value 192 shall be used for this parameter.

The ALPHA parameter is not included, and default value 0 shall be used for this parameter.

The RESEGMENT parameter is not included, and default value 0 shall be used for this parameter.

The USF_GRANULARITY parameter is not included, and default value 0 shall be used for this parameter, i.e. the mobile station shall transmit one RLC/MAC block if assigned USF is received.

FIG. 6D

Table 10.5.2.78.2 (3GPP TS 44.018): *IPA Rest Octets* information element details (continued)

*IPA Downlink Assignment struct*

Random Reference, FN_OFFSET, GAMMA, TFI_ASSIGNMENT, TIMING_ADVANCE_VALUE, TN, EGPRS Window Size, ALPHA fields and Frequency Parameters IE

These fields are encoded as in *IPA Uplink Assignment struct*.

The TLLI field (32 bit field) is the binary representation of a TLLI. The coding of TLLI is left open for each administration using the structure specified in 3GPP TS 23.003.

The RLC_MODE field (1 bit field) indicates the RLC mode, see 3GPP TS 44.060:

0    RLC acknowledged mode;

1    RLC unacknowledged mode.

LINK_QUALITY_MEASUREMENT_MODE (2 bit field)

This field is encoded as the LINK_QUALITY_MEASUREMENT_MODE in the PACKET DOWNLINK ASSIGNMENT message in 3GPP TS 44.060.

*IPA Single Block Uplink Assignment struct*

Random Reference, FN_OFFSET, GAMMA, TIMING_ADVANCE_VALUE, TN, ALPHA fields and Frequency Parameters IE

These fields are encoded as in *IPA Uplink Assignment struct*.

The STARTING_TIME_OFFSET field (6 bit field) is a positive offset added to the first FN of this received IMMEDIATE PACKET ASSIGNMENT message which indicates the start frame number of the assigned single uplink block. Range 0 to 63.

RCC (3 bit)

See sub-clause 10.5.2.16.

*Information not associated with any structs*

The Short ID 1, Short ID 2, Short ID 3, Short ID 4 field (8 bit field) is the 8 bits of the Short ID parameter included in EGPRS MULTILATERATION REQUEST message indicating the Access Burst method defined in 3GPP TS 44.060.

Short ID N (8 bit)

This field is used by the BSS to confirm reception of an EGPRS MULTILATERATION REQUEST message indicating the Access Burst method.

Table 9.1.XX.1 (3GPP TS 44.018): EC IMMEDIATE ASSIGNMENT TYPE 3 message content

```
< EC Immediate Assignment Type 3 message content > ::=
    < Message Type : bit (4) >
        < Used DL Coverage Class : bit (2) >
        { 0 | 1 < EC Page Extension : bit (4) > }
        < Short ID : bit (8) >
        <spare padding> ;
```

FIG. 7B

Table 9.1.XX.2 (3GPP TS 44.018): EC IMMEDIATE ASSIGNMENT TYPE 3 message details

| |
|---|
| Message Type (4 bit field)<br>This field indicates the type of message sent on the EC-CCCH (see Table 10.4.4) |
| Used DL Coverage Class (2 bit field)<br><br>The EC IMMEDIATE ASSIGNMENT TYPE 3 message is sent using blind physical layer transmissions specific to the TSC value used by the MS when sending the corresponding EC MULTILATERATION REQUEST message on the EC-RACH. The Used DL Coverage Class field is included to inform other mobile stations about the downlink coverage class, and thus the number of blind physical layer transmissions, that have been used to transmit the current EC IMMEDIATE ASSIGNMENT TYPE 3 message. Mobile stations that have selected a lower downlink coverage class than what is indicated by this field can, upon successfully reading the control message, can avoid monitoring any remaining blind physical layer transmissions used to send the control message. This field is coded as follows:<br>bit<br>2 1<br>0 0        DL CC 1<br>0 1        DL CC 2<br>1 0        DL CC 3<br>1 1        DL CC 4 |
| EC Page Extension (4 bit field)<br>See sub-clause 9.1.60. |
| Short ID (8 bit field)<br><br>This field identifies a cell specific 8 bit Short ID value used by a MS performing the MTA procedure using the Access Burst method (see sub-clause 3.11). The Short ID value used by a MS in a given cell is pre-determined (selected by the SMLC and included as part of cell specific assistance information applicable to the Multilateration Timing Advance procedure – see 3GPP TS 44.031). It allows the BSS managing a cell in which it receives an EC MULTILATERATION REQUEST message containing a Short ID field to identify the applicable SCCP connection between the BSS and the serving SMLC (see 3GPP TS 49.031 and 3GPP TS 44.031). |

ASSIGNMENT MESSAGES ACKNOWLEDGING ACCESS ATTEMPT WITHOUT ASSIGNING RESOURCES

CLAIM OF PRIORITY

This application is a continuation of U.S. patent application Ser. No. 15/887,782, filed on Feb. 2, 2018, which claims the benefit of U.S. Provisional Application Serial Nos. 62/453,840, 62/475,369, and 62/477,806 respectively filed on Feb. 2, 2017, Mar. 23, 2017, and Mar. 28, 2017, the entire contents of each of which are hereby incorporated by reference for all purposes.

RELATED PATENT APPLICATIONS

This application is related to the co-filed U.S. patent application Ser. Nos. 15/887,799 and 15/887,808, each entitled "Assignment Messages Acknowledging Access Attempt without Assigning Resources", each of which claims the benefit of priority to U.S. Provisional Application Ser. Nos. 62/453,840, 62/475,369, and 62/477,806. The entire contents of each of these documents are hereby incorporated by reference herein for all purposes.

TECHNICAL FIELD

The present disclosure relates generally to the wireless telecommunications field and, more particularly, to a mobile station (MS), a base station subsystem (BSS), and various methods that enable the MS to acknowledgement of an access attempt for performing a multilateration timing advance (MTA) procedure using the Access Burst method without also being assigned resources.

BACKGROUND

The following abbreviations are herewith defined, at least some of which are referred to within the following description of the present disclosure.
3GPP 3rd-Generation Partnership Project
AGCH Access Grant Channel
ASIC Application Specific Integrated Circuit
BSS Base Station Subsystem
BSSMAP Base Station Subsystem Mobile Application Part
BSSMAP-LE BSSMAP-Location Services Extension
BTS Base Transceiver Station
CN Core Network
DSP Digital Signal Processor
EC Extended Coverage
EC-AGCH Extended Coverage Access Grant Channel
EC-GSM Extended Coverage Global System for Mobile Communications
EC-PDTCH Extended Coverage-Packet Data Traffic Channel
EC-RACH Extended Coverage-Random Access Channel
EDGE Enhanced Data rates for GSM Evolution
EGPRS Enhanced General Packet Radio Service
eMTC Enhanced Machine Type Communications
GSM Global System for Mobile Communications
GERAN GSM/EDGE Radio Access Network
GPRS General Packet Radio Service
IA Immediate Assignment
IE Information Element
IoT Internet of Things
IPA Immediate Packet Assignment
LTE Long-Term Evolution
MME Mobility Management Entity
MS Mobile Station
MTA Multilateration Timing Advance
MTC Machine Type Communications
NB-IoT Narrow Band Internet of Things
PDN Packet Data Network
PDTCH Packet Data Traffic Channel
RACH Random Access Channel
RAN Radio Access Network
RLC Radio Link Control
SGSN Serving GPRS Support Node
SMLC Serving Mobile Location Center
TA Timing Advance
TBF Temporary Block Flow
TLLI Temporary Logical Link Identifier
TS Technical Specification
TSG Technical Specification Group
UE User Equipment
UL Uplink
UMTS Universal Mobile Telephony System
WCDMA Wideband Code Division Multiple Access
WiMAX Worldwide Interoperability for Microwave Access At the 3rd-Generation Partnership Project (3GPP) Technical Specification Group (TSG) Radio Access Network (RAN) Meeting #72, a Work Item on "Positioning Enhancements for GERAN" was approved (see RP-161260; Busan, Korea; 13-16 Jun. 2016—the contents of which are hereby incorporated herein by reference for all purposes), wherein one candidate method for realizing improved accuracy when determining the position of a mobile station (MS) is multilateration timing advance (MTA) (see RP-161034; Busan, Korea; 13-16 Jun. 2016—the contents of which are hereby incorporated herein by reference for all purposes), which relies on establishing the MS position based on timing advance (TA) values in multiple cells.

At the 3GPP TSG-RAN1 Meeting #86, a proposal based on a similar approach was made also to support positioning of Narrow Band Internet of Things (NB-IoT) mobiles (see R1-167426; Gothenburg, Sweden; 22-26 Aug. 2016—the contents of which are hereby incorporated herein by reference for all purposes).

TA is a measure of the propagation delay between a base transceiver station (BTS) and the MS, and since the speed by which radio waves travel is known, the distance between the BTS and the MS can be derived. Further, if the TA applicable to the MS is measured within multiple BTSs and the positions of these BTSs are known, the position of the MS can be derived using the measured TA values. The measurement of the TA requires that the MS synchronize to each neighbor BTS and transmit a signal time-aligned with the estimated timing of the downlink channel received from each BTS. The BTS measures the time difference between its own time reference for the downlink channel, and the timing of the received signal (transmitted by the MS). This time difference is equal to two times the propagation delay between the BTS and the MS (one propagation delay of the BTS's synchronization signal sent on the downlink channel to the MS, plus one equal propagation delay of the signal transmitted by the MS back to the BTS).

Once the set of TA values are established using a set of one or more BTSs during a given positioning procedure, the position of the MS can be derived through a so called multilateration timing advance procedure wherein the position of the MS is determined by the intersection of a set of hyperbolic curves associated with each BTS. The calculation of the position of the MS is typically carried out by a serving positioning node (i.e., serving Serving Mobile Location Center (SMLC)), which implies that all of the derived TA and associated BTS position information needs to be sent to the positioning node (i.e., the serving SMLC) that initiated the positioning procedure.

Referring to FIG. 1 (PRIOR ART) there is shown a diagram of an exemplary wireless communication network 100 used to help explain the multilateration timing advance procedure in determining a position of a mobile station 102 (MS 102). The exemplary wireless communication network 100 has several nodes which are shown and defined herein as follows:

Foreign BTS 104$_3$: A BTS 104$_3$ (shown as foreign BTS3 104$_3$) associated with a BSS 106$_3$ (shown as non-serving BSS3 106$_3$) that uses a positioning node 108$_2$ (shown as non-serving SMLC2 108$_2$) that is different from a positioning node (shown as serving SMLC1 108$_1$) which is used by the BSS 106$_1$ (shown as serving BSS1 106$_1$) that manages the cell serving the MS 102 when the positioning (MTA) procedure is initiated. The derived TA information (TA3 114$_3$) and identity of the corresponding cell are relayed by the BSS 106$_3$ (shown as non-serving BSS3 106$_3$), the SGSN 110 (core network), and the BSS 106$_1$ (shown as serving BSS1 106$_1$) to the serving positioning node (shown as serving SMLC1 108$_1$) (i.e., in this case the non-serving BSS3 106$_3$ has no context for the MS 102). The BSS 106$_3$ (shown as non-serving BSS3 106$_3$) can be associated with one or more BTSs 104$_3$ (only one shown) and a BSC 112$_3$ (shown as non-serving BSC3 112$_3$).

Local BTS 104$_2$: A BTS 104$_2$ (shown as local BTS2 104$_2$) associated with a BSS 106$_2$ (shown as non-serving BSS2 106$_2$) that uses the same positioning node 108$_1$ (shown as serving SMLC1 108$_1$) as the BSS 106$_1$ (shown as serving BSS1 106$_1$) that manages the cell serving the MS 102 when the positioning (MTA) procedure is initiated. The derived TA information (TA2 114$_2$) and identity of the corresponding cell are relayed by the BSS 106$_2$ (shown as non-serving BSS2 106$_2$) and the BSS 106$_1$ (shown as serving BSS1 106$_1$) to the serving positioning node (shown as serving SMLC1 108$_1$) (i.e., in this case the non-serving BSS2 106$_2$ has no context for the MS 102) (i.e., inter-BSS communications allows the non-serving BSS2 106$_2$ to relay the derived TA information (TA2 114$_2$) and the identity of the corresponding cell to the serving BSS1 106$_1$). The BSS 106$_2$ (shown as non-serving BSS2 106$_2$) can be associated with one or more BTSs 104$_2$ (only one shown) and a BSC 112$_2$ (shown as non-serving BSC2 112$_2$).

Serving BTS 104$_1$: A BTS 104$_1$ (shown as serving BTS1 104$_1$) associated with a BSS 106$_1$ (shown as serving BSS1 106$_1$) that manages the cell serving the MS 102 when the positioning (MTA) procedure is initiated. The derived TA information (TA1 114$_1$) and identity of the corresponding cell are sent directly by the BSS 106$_1$ (shown as serving BSS1 106$_1$) to the serving positioning node 108$_1$ (shown as serving SMLC1 108$_1$) (i.e., in this case the serving BSS1 106$_1$ has a context for the MS 102). The BSS 106$_1$ (shown as serving BSS1 106$_1$) can be associated with one or more BTSs 104$_1$ (only one shown) and a BSC 112$_1$ (shown as serving BSC1 112$_1$).

Serving SMLC 108$_1$: The SMLC 108$_1$ (shown as serving SMLC1 108$_1$) that commands the MS 102 to perform the positioning (MTA) procedure (i.e., the SMLC 108$_1$ sends a Radio Resource Location services Protocol (RRLP) Multilateration Timing Advance Request message to the MS 102).

Serving BSS 106$_1$: The BSS 106$_1$ (shown as serving BSS1 106$_1$) associated with the serving BTS 104$_1$ (shown as serving BTS1 104$_1$) (i.e., the BSS 106$_1$ that has context information for the Temporary Logical Link Identity (TLLI) corresponding to the MS 102 for which the positioning (MTA) procedure has been triggered).

Non-serving BSS 106$_2$ and 106$_3$: A BSS 106$_3$ (shown as non-serving BSS3 106$_3$) associated with a foreign BTS 104$_3$ (shown as foreign BTS3 104$_3$) and a BSS 106$_2$ (shown as non-serving BSS2 106$_2$) associated with a local BTS 104$_2$ (shown as local BTS2 104$_2$) (i.e., the BSSs 106$_2$ and 106$_3$ do not have context information for the TLLI corresponding to the MS 102 for which the positioning (MTA) procedure has been triggered).

FIG. 1 is an illustration of an exemplary MTA procedure involving three BTSs 104$_1$, 104$_2$, and 104$_3$ associated with three timing advance (TA) values 114$_1$, 114$_2$, 114$_3$ for a particular MS 102. The multilateration can involve more than three BTSs 104$_1$, 104$_2$, and 104$_3$ and more than three TA values 114$_1$, 114$_2$, 114$_3$. FIG. 1 illustrates an exemplary wireless communication network 100 showing the basic nodes which are needed to explain the positioning (MTA) process. It should be appreciated that the exemplary wireless communication network 100 includes additional nodes which are well known in the art.

The serving SMLC 108$_1$ may decide to use the MTA procedure upon receiving a Base Station Subsystem Mobile Application Part-Location Services Extension (BSSMAP-LE) Perform Location Request message from the serving BSS 106$_1$ that includes the 'BSS Multilateration Capability' Information Element (IE). The RRLP Multilateration Timing Advance Request message sent by the serving SMLC 108$_1$ to the MS 102 to trigger an MTA type positioning event may include cell specific assistance information to be used by the MS 102 if it selects one or more of those cells for performing the MTA procedure. The MTA procedure may be performed using one of the following methods.

Method 1: MTA—Radio Link Control (RLC) Data Block method. This method involves the MS 102 sending an access request on the Random Access Channel (RACH)/Extended Coverage-Random Access Channel (EC-RACH) and being assigned a single RLC data block transmission opportunity on a Packet Data Traffic Channel (PDTCH)/Extended Coverage-Packet Data Traffic Channel (EC-PDTCH). The serving BSS 106$_1$ uses the transmitted RLC data block for deriving Timing Advance information and the content thereof for acquiring other information (e.g., TLLI) used by the serving SMLC 108$_1$ for proceeding with the positioning estimate.

Method 2: MTA—Extended Access Burst method. This method involves an MS 102 sending an access request on the RACH/EC-RACH using an Access Burst and being assigned a Timing Advance value which the MS 102 then uses to send an Extended Access Burst on the RACH/EC-RACH. The serving BSS 106$_1$ uses the Extended Access Burst for deriving Timing Advance information and for acquiring other information (e.g., Short ID) used by the serving SMLC 108$_1$ for proceeding with the positioning estimate (see R6-160234; entitled "Extended Access Burst for TA estimation (update of R6-160205);" Source: Nokia; Reno, Nev., U.S.A.; 14-18 Nov. 2016—the contents of which are hereby incorporated herein by reference for all purposes).

Method 3: MTA—Access Burst method. This method involves an MS 102 sending an access request on the RACH/EC-RACH using an Access Burst with no additional transmissions performed by the MS 102. It can only be used in cells managed by the serving BSS 106$_1$ and makes use of a cell specific Short ID (e.g., 8 bits) value provided to the MS 102 as part of the assistance information it receives from the serving SMLC 108$_1$ in an RRLP MTA message. The serving BSS 106₁ uses the access burst alone for deriving Timing Advance information used by the serving SMLC 108₁ for proceeding with the positioning estimate.

When the MS 102 uses the Access Burst method in any given cell, the MS 102 needs to know whether or not its access burst has been successfully received by the serving BSS 106₁, and as such the serving BSS 106₁ needs to send the MS 102 some form of acknowledgement that confirms reception of the access burst without also assigning the MS 102 radio resources for an uplink Temporary Block Flow (TBF) (i.e., since no RLC Data Block needs to be transmitted using the Access Burst method).

The legacy Immediate Assignment message is used to both acknowledge BSS reception of a specific access burst on the RACH and to assign the corresponding MS radio resources for an uplink TBF and is therefore not suitable (as currently defined) for sending as an acknowledgement to an MS that has enabled PEO (Power Efficient Operation, see 3GPP Technical Specification (TS) 44.018 V14.0.0 (2016-12); Mobile radio interface layer 3 specification; GSM/EDGE Radio Resource Control (RRC) protocol (Release 14); hereinafter "3GPP TS 44.018"; the contents of 3GPP TS 44.018 are hereby incorporated herein by reference for all purposes) and is performing the MTA procedure using the Access Burst method. Similarly, the legacy Extended Coverage (EC) Immediate Assignment Type 2 message is used to both acknowledge BSS reception of a specific set of access bursts on the EC-RACH and to assign the corresponding MS radio resources for an uplink TBF and is therefore not suitable (as currently defined) for sending as an acknowledgement to an MS that has enabled EC operation (EC-GSM-IoT, see 3GPP TS 44.018) and is performing the MTA procedure using the Access Burst method.

SUMMARY

A mobile station, a base station subsystem (BSS) and various methods for addressing the aforementioned problems are described in the independent claims. Advantageous embodiments of the mobile station, the BSS and the various methods are further described in the dependent claims.

In one aspect, the present disclosure provides a mobile station configured to interact with a base station subsystem (BSS), the mobile station enabled for power efficient operation (PEO) and capable of performing a multilateration timing advance (MTA) procedure. The mobile station comprises a processor and a memory that stores processor-executable instructions, wherein the processor interfaces with the memory to execute the processor-executable instructions. The mobile station is operable to perform a first receive operation, a transmit operation, and a second receive operation. In the first receive operation, the mobile station receives an MTA request message for the mobile station to perform a radio access part of the MTA procedure. In the transmit operation, the mobile station transmits, to the BSS, a multilateration request message that indicates an Access Burst method for performing the MTA procedure. In the second receive operation, the mobile station receives, from the BSS, an assignment message acknowledging that the BSS received the multilateration request message without assigning radio resources for the mobile station. An advantage of the mobile station performing these operations is that it is able to receive confirmation of its access attempt for performing the MTA procedure using the Access Burst method without also being unnecessarily assigned radio resources, which the mobile station does not need when using the Access Burst method.

In another aspect, the present disclosure provides a method in a mobile station that is configured to interact with a base station subsystem (BSS), the mobile station enabled for power efficient operation (PEO) and capable of performing a multilateration timing advance (MTA) procedure. The method comprises a first receiving step, a transmitting step, and a second receiving step. In the first receiving step, the mobile station receives an MTA request message for the mobile station to perform a radio access part of the MTA procedure. In the transmitting step, the mobile station transmits, to the BSS, a multilateration request message that indicates an Access Burst method for performing the MTA procedure. In the second receiving step, the mobile station receives, from the BSS, an assignment message acknowledging that the BSS received the multilateration request message without assigning radio resources for the mobile station. An advantage of the mobile station performing these steps is that it is able to receive confirmation of its access attempt for performing the MTA procedure using the Access Burst method without also being unnecessarily assigned radio resources, which the mobile station does not need when using the Access Burst method.

In yet another aspect, the present disclosure provides a Base Station Subsystem (BSS) configured to interact with a mobile station enabled for power efficient operation (PEO) and capable of performing a multilateration timing advance (MTA) procedure. The BSS comprises a processor and a memory that stores processor-executable instructions, wherein the processor interfaces with the memory to execute the processor-executable instructions. The BSS is operable to perform a receive operation and a transmit operation. In the receive operation, the BSS receives, from the mobile station, a multilateration request message that indicates an Access Burst method for performing the MTA procedure. In the transmit operation, the BSS transmits, to the mobile station, an assignment message acknowledging that the BSS received the multilateration request message without assigning radio resources for the mobile station. An advantage of the BSS performing these operations is that it is able to send confirmation of the mobile station's access attempt for performing the MTA procedure using the Access Burst method without also unnecessarily assigning radio resources to the mobile station, which it does not need when using the Access Burst method.

In still yet another aspect, the present disclosure provides a method in a BSS that is configured to interact with a mobile station enabled for power efficient operation (PEO) and capable of performing a multilateration timing advance (MTA) procedure. The method comprises a receiving step and a transmitting step. In the receiving step, the BSS receives, from the mobile station, a multilateration request message that indicates an Access Burst method for performing the MTA procedure. In the transmitting step, the BSS transmits, to the mobile station, an assignment message acknowledging that the BSS received the multilateration request message without assigning radio resources for the mobile station. An advantage of the BSS performing these steps is that it is able to send confirmation of the mobile station's access attempt for performing the MTA procedure using the Access Burst method without also unnecessarily assigning radio resources to the mobile station, which it does not need when using the Access Burst method.

In one aspect, the present disclosure provides a mobile station configured to interact with a base station subsystem (BSS), the mobile station enabled for power efficient operation (PEO) and capable of performing a multilateration timing advance (MTA) procedure. The mobile station comprises a processor and a memory that stores processor-executable instructions, wherein the processor interfaces with the memory to execute the processor-executable instructions. The mobile station is operable to perform a first receive operation, a transmit operation, and a second receive operation. In the first receive operation, the mobile station receives an MTA request message for the mobile station to perform a radio access part of the MTA procedure. In the transmit operation, the mobile station transmits, to the BSS, a multilateration request message that indicates an Access Burst method for performing the MTA procedure. In the second receive operation, the mobile station receives, from the BSS, a packet assignment message acknowledging that the BSS received the multilateration request message without assigning packet resources for the mobile station. An advantage of the mobile station performing these operations is that it is able to receive confirmation of its access attempt for performing the MTA procedure using the Access Burst method without also being unnecessarily assigned packet resources, which the mobile station does not need when using the Access Burst method.

In another aspect, the present disclosure provides a method in a mobile station that is configured to interact with a base station subsystem (BSS), the mobile station enabled for power efficient operation (PEO) and capable of performing a multilateration timing advance (MTA) procedure. The method comprises a first receiving step, a transmitting step, and a second receiving step. In the first receiving step, the mobile station receives an MTA request message for the mobile station to perform a radio access part of the MTA procedure. In the transmitting step, the mobile station transmits, to the BSS, a multilateration request message that indicates an Access Burst method for performing the MTA procedure. In the second receiving step, the mobile station receives, from the BSS, a packet assignment message acknowledging that the BSS received the multilateration request message without assigning packet resources for the mobile station. An advantage of the mobile station performing these steps is that it is able to receive confirmation of its access attempt for performing the MTA procedure using the Access Burst method without also being unnecessarily assigned packet resources, which the mobile station does not need when using the Access Burst method.

In yet another aspect, the present disclosure provides a Base Station Subsystem (BSS) configured to interact with a mobile station enabled for power efficient operation (PEO) and capable of performing a multilateration timing advance (MTA) procedure. The BSS comprises a processor and a memory that stores processor-executable instructions, wherein the processor interfaces with the memory to execute the processor-executable instructions. The BSS is operable to perform a receive operation and a transmit operation. In the receive operation, the BSS receives, from the mobile station, a multilateration request message that indicates an Access Burst method for performing the MTA procedure. In the transmit operation, the BSS transmits, to the mobile station, a packet assignment message acknowledging that the BSS received the multilateration request message without assigning packet resources for the mobile station. An advantage of the BSS performing these operations is that it is able to send confirmation of the mobile station's access attempt for performing the MTA procedure using the Access Burst method without also unnecessarily assigning packet resources to the mobile station, which it does not need when using the Access Burst method.

In still yet another aspect, the present disclosure provides a method in a BSS that is configured to interact with a mobile station enabled for power efficient operation (PEO) and capable of performing a multilateration timing advance (MTA) procedure. The method comprises a receiving step and a transmitting step. In the receiving step, the BSS receives, from the mobile station, a multilateration request message that indicates an Access Burst method for performing the MTA procedure. In the transmitting step, the BSS transmits, to the mobile station, a packet assignment message acknowledging that the BSS received the multilateration request message without assigning packet resources for the mobile station. An advantage of the BSS performing these steps is that it is able to send confirmation of the mobile station's access attempt for performing the MTA procedure using the Access Burst method without also unnecessarily assigning packet resources to the mobile station, which it does not need when using the Access Burst method.

In one aspect, the present disclosure provides a mobile station configured to interact with a base station subsystem (BSS), the mobile station enabled for extended coverage (EC) operation and capable of performing a multilateration timing advance (MTA) procedure. The mobile station comprises a processor and a memory that stores processor-executable instructions, wherein the processor interfaces with the memory to execute the processor-executable instructions. The mobile station is operable to perform a first receive operation, a transmit operation, and a second receive operation. In the first receive operation, the mobile station receives an MTA request message for the mobile station to perform a radio access part of the MTA procedure. In the transmit operation, the mobile station transmits, to the BSS, a multilateration request message that indicates an Access Burst method for performing the MTA procedure. In the second receive operation, the mobile station receives, from the BSS, an assignment message acknowledging that the BSS received the multilateration request message without assigning radio resources for the mobile station. An advantage of the mobile station performing these operations is that it is able to receive confirmation of its access attempt for performing the MTA procedure using the Access Burst method without also being unnecessarily assigned radio resources, which the mobile station does not need when using the Access Burst method.

In another aspect, the present disclosure provides a method in a mobile station that is configured to interact with a base station subsystem (BSS), the mobile station enabled for extended coverage (EC) operation and capable of performing a multilateration timing advance (MTA) procedure. The method comprises a first receiving step, a transmitting step, and a second receiving step. In the first receiving step, the mobile station receives an MTA request message for the mobile station to perform a radio access part of the MTA procedure. In the transmitting step, the mobile station transmits, to the BSS, a multilateration request message that indicates an Access Burst method for performing the MTA procedure. In the second receiving step, the mobile station receives, from the BSS, an assignment message acknowledging that the BSS received the multilateration request message without assigning radio resources for the mobile station. An advantage of the mobile station performing these steps is that it is able to receive confirmation of its access attempt for performing the MTA procedure using the Access Burst method without also being unnecessarily assigned radio resources, which the mobile station does not need when using the Access Burst method.

In yet another aspect, the present disclosure provides a Base Station Subsystem (BSS) configured to interact with a mobile station enabled for extended coverage (EC) operation and capable of performing a multilateration timing advance (MTA) procedure. The BSS comprises a processor and a memory that stores processor-executable instructions, wherein the processor interfaces with the memory to execute the processor-executable instructions. The BSS is operable to perform a receive operation and a transmit operation. In the receive operation, the BSS receives, from the mobile station, a multilateration request message that indicates an Access Burst method for performing the MTA procedure. In the transmit operation, the BSS transmits, to the mobile station, an assignment message acknowledging that the BSS received the multilateration request message without assigning radio resources for the mobile station. An advantage of the BSS performing these operations is that it is able to send confirmation of the mobile station's access attempt for performing the MTA procedure using the Access Burst method without also unnecessarily assigning radio resources to the mobile station, which it does not need when using the Access Burst method.

In still yet another aspect, the present disclosure provides a method in a BSS that is configured to interact with a mobile station enabled for extended coverage (EC) operation and capable of performing a multilateration timing advance (MTA) procedure. The method comprises a receiving step and a transmitting step. In the receiving step, the BSS receives, from the mobile station, a multilateration request message that indicates an Access Burst method for performing the MTA procedure. In the transmitting step, the BSS transmits, to the mobile station, an assignment message acknowledging that the BSS received the multilateration request message without assigning radio resources for the mobile station. An advantage of the BSS performing these steps is that it is able to send confirmation of the mobile station's access attempt for performing the MTA procedure using the Access Burst method without also unnecessarily assigning radio resources to the mobile station, which it does not need when using the Access Burst method.

Additional aspects of the present disclosure will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the present disclosure.

BRIEF DESCRIPTION OF THE DRAWINGS

A more complete understanding of the present disclosure may be obtained by reference to the following detailed description when taken in conjunction with the accompanying drawings:

FIG. 3A illustrates details of a legacy Immediate Assignment message;

FIGS. 3B-3D illustrate details of a 'Dedicated mode or TBF' IE in accordance with an embodiment of the present disclosure;

FIG. 3E is a diagram illustrating one possible coding of an 'Immediate Assignment (IA) Rest Octets' IE in accordance with an embodiment of the present disclosure;

FIGS. 3F-3G illustrate details of Immediate Assignment messages in accordance with embodiments of the present disclosure;

FIG. 4 illustrates details of a 'Dedicated mode or TBF' IE in accordance with an embodiment of the present disclosure;

FIGS. 5A-5B illustrate details of a new Immediate Assignment Type 2 message and its 'Short ID' IE in accordance with an embodiment of the present disclosure;

FIG. 6A illustrates details of an Immediate Packet Assignment message in accordance with an embodiment of the present disclosure;

FIGS. 6B-6D illustrate one possible coding and details of an 'Immediate Packet Assignment (IPA) Rest Octets' IE of the Immediate Packet Assignment message of FIG. 6A in accordance with an embodiment of the present disclosure;

FIGS. 7A-7B illustrate one possible coding and details of a new EC Immediate Assignment Type 3 message in accordance with an embodiment of the present disclosure;

DETAILED DESCRIPTION

Figure 1:
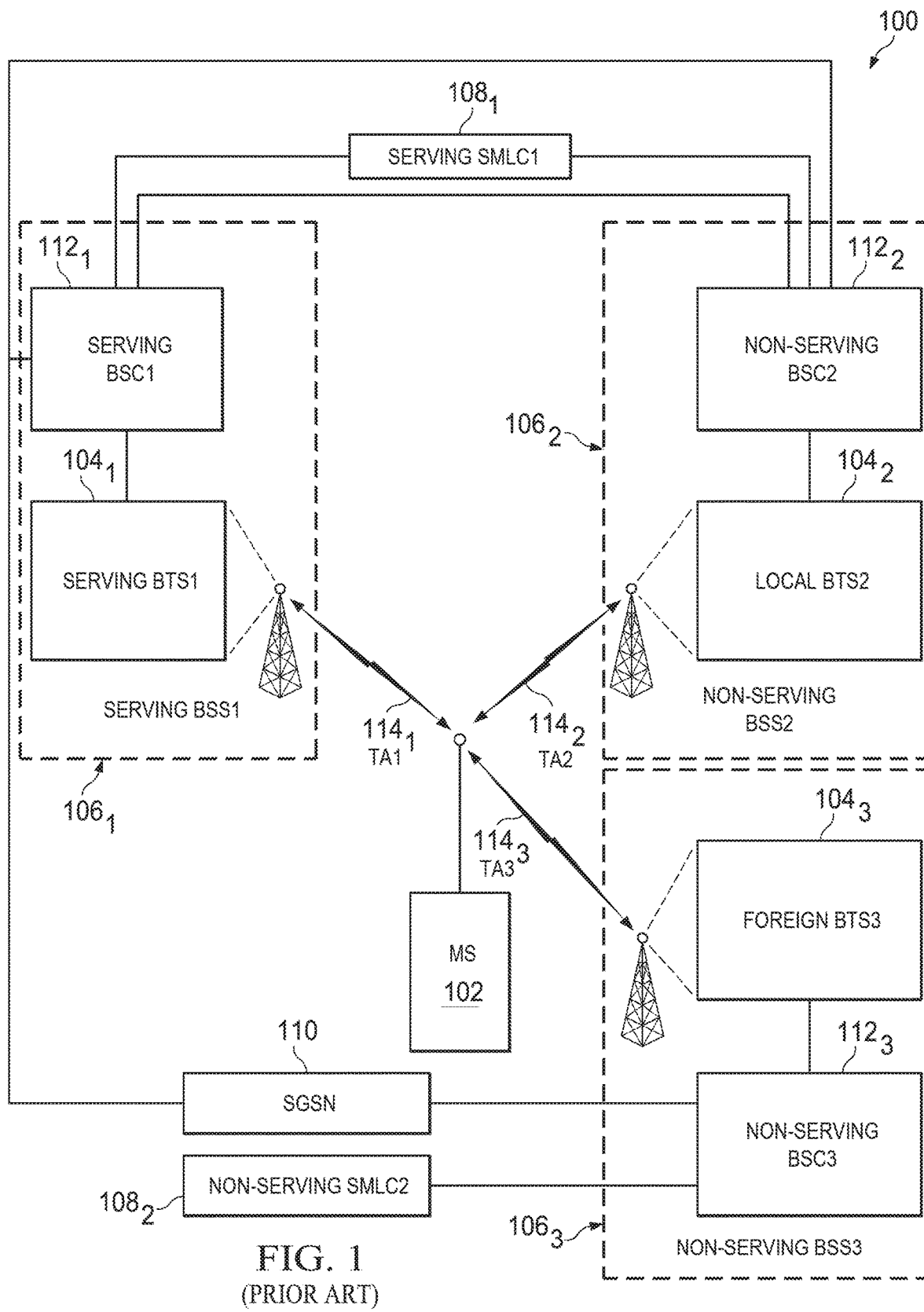
FIG. 1 (PRIOR ART) is a diagram of an exemplary wireless communication network used to help explain the multilateration timing advance procedure in determining a position of a mobile station.
Figure 2:
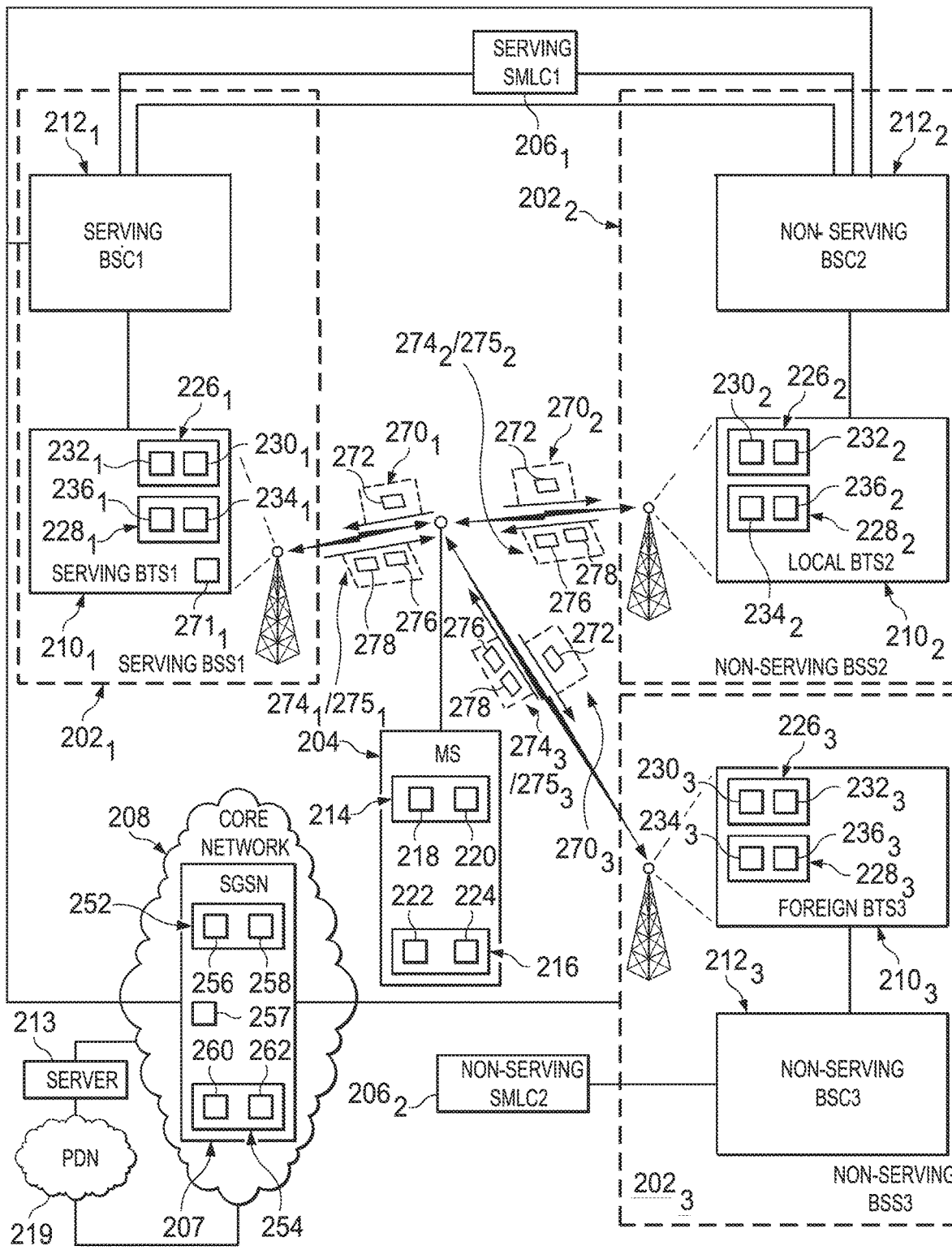
FIG. 2 is a diagram of an exemplary wireless communication network which includes a SGSN, multiple SMLCs, multiple BSSs, and a mobile station which are configured in accordance with an embodiment of the present disclosure.

A discussion is provided herein first to describe an exemplary wireless communication network 200 that includes multiple BSSs $202_1$, $202_2$, $202_3$, a mobile station 204, and multiple SMLCs $206_1$ and $206_2$ configured to enable a mobile station (MS) 204 to receive acknowledgement of an access attempt for performing a multilateration timing advance (MTA) procedure using the Access Burst method without also being assigned resources (e.g., packet resources, radio resources for a temporary block flow (TBF))

in accordance with an embodiment of the present disclosure (see FIG. 2). Then, a discussion is provided to disclose various techniques that the BSSs $202_1$, $202_2$, $202_3$ and the mobile station 204 can use to enable acknowledgement of the mobile station's 204 access attempt for performing the MTA procedure without also being assigned radio resources in accordance with different embodiments of the present disclosure (see FIGS. 3A-7B). Thereafter, a discussion is provided to explain the basic functionalities-configurations of the mobile station 204 and the BSSs $202_1$, $202_2$, $202_3$, each of which are configured to enable acknowledgement of the mobile station's 204 access attempt for performing the MTA procedure without also being assigned radio resources in accordance with different embodiments of the present disclosure (see FIGS. 8-19).

Exemplary Wireless Communication Network 200

Referring to FIG. 2, there is illustrated an exemplary wireless communication network 200 in accordance with the present disclosure. The wireless communication network 200 includes a core network (CN) 208 (which comprises at least one CN node 207 (e.g., SGSN 207)), multiple SMLCs $206_1$ and $206_2$, and multiple BSSs $202_1$, $202_2$, $202_3$, (only three shown) which interface with a mobile station 204 (only one shown) (note: in practice there would be multiple mobile stations 204 but for clarity only one mobile station 204 is discussed herein). The wireless communication network 200 also includes many well-known components, but for clarity, only the components needed to describe the features of the present disclosure are described herein. Further, the wireless communication network 200 is described herein as being a GSM/EGPRS wireless communication network 200 which is also known as an EDGE wireless communication network 200. However, those skilled in the art will readily appreciate that the techniques of the present disclosure which are applied to the GSM/EGPRS wireless communication network 200 are generally applicable to other types of wireless communication systems, including, for example, EC-GSM, WCDMA, LTE, and WiMAX systems.

The wireless communication network 200 includes the BSSs $202_1$, $202_2$, $202_3$ (which are basically wireless access nodes $202_1$, $202_2$, $202_3$, RAN nodes $202_1$, $202_2$, $202_3$, wireless access points $202_1$, $202_2$, $202_3$) which can provide network access to the mobile station 204. Each BSS $202_1$, $202_2$, $202_3$ includes one or more BTSs $210_1$, $210_2$, $210_3$ and a BSC $212_1$, $212_2$, $212_3$. The BSSs $202_1$, $202_2$, $202_3$ are connected to the core network 208 and, in particular, to the CN node 207 (e.g., SGSN 207). The core network 208 is connected to an external packet data network (PDN) 219, such as the Internet, and a server 213 (only one shown). The mobile station 204 may communicate with one or more servers 213 (only one shown) connected to the core network 208 and/or the PDN 219.

The mobile station 204 may be referred to generally as an end terminal (user) that attaches to the wireless communication network 200, and may refer to either a Machine Type Communications (MTC) device (e.g., a smart meter) or a non-MTC device. Further, the term "mobile station" is generally intended to be synonymous with the term mobile device, wireless device, "User Equipment," or UE, as that term is used by 3GPP, and includes standalone mobile stations, such as terminals, cell phones, smart phones, tablets, Internet of Things (IoT) devices, cellular IoT devices, and wireless-equipped personal digital assistants, as well as wireless cards or modules that are designed for attachment to or insertion into another electronic device, such as a personal computer, electrical meter, etc. . . .

The mobile station 204 may include a transceiver circuit 214 for communicating with the BSSs $202_1$, $202_2$, $202_3$ (RAN nodes $202_1$, $202_2$, $202_3$), and a processing circuit 216 for processing signals transmitted from and received by the transceiver circuit 214 and for controlling the operation of the mobile station 204. The transceiver circuit 214 may include a transmitter 218 and a receiver 220, which may operate according to any standard, e.g., the GSM/EDGE standard, and the EC-GSM standard. The processing circuit 216 may include a processor 222 and a memory 224 for storing program code for controlling the operation of the mobile station 204. The program code may include code for performing the procedures as described hereinafter.

Each BTS $210_1$, $210_2$, $210_3$ may include a transceiver circuit $226_1$, $226_2$, $226_3$ for communicating with the mobile station 204 (typically multiple mobile stations 204—only one shown for clarity) and their respective BSC $212_1$, $212_2$, $212_3$, a processing circuit $228_1$, $228_2$, $228_3$ for processing signals transmitted from and received by the transceiver circuit $226_1$, $226_2$, $226_3$ and for controlling the operation of the corresponding BTS $210_1$, $210_2$, $210_3$. The transceiver circuit $226_1$, $226_2$, $226_3$ may include a transmitter $230_1$, $230_2$, $230_3$ and a receiver $232_1$, $232_2$, $232_3$, which may operate according to any standard, e.g., the GSM/EDGE standard, and the EC-GSM standard. The processing circuit $228_1$, $228_2$, $228_3$ may include a processor $234_1$, $234_2$, $234_3$, and a memory $236_1$, $236_2$, $236_3$ for storing program code for controlling the operation of the corresponding BTS $210_1$, $210_2$, $210_3$. The program code may include code for performing the procedures as described hereinafter.

Each BSC $212_1$, $212_2$, $212_3$ may include a transceiver circuit for communicating with their respective BTS $210_1$, $210_2$, $210_3$ and SMLC $206_1$, $206_2$, a processing circuit for processing signals transmitted from and received by the transceiver circuit and for controlling the operation of the corresponding BSC $212_1$, $212_2$, $212_3$, and a network interface for communicating with the SGSN 207 part of the core network 208. The transceiver circuit may include a transmitter and a receiver, which may operate according to any standard, e.g., the GSM/EDGE standard (in this example), and the EC-GSM standard. The processing circuit may include a processor and a memory for storing program code for controlling the operation of the corresponding BSC $212_1$, $212_2$, $212_3$. The program code may include code for performing the procedures as described hereinafter. Note: for purposes of the discussion herein, it should be appreciated that the BSS $202_1$, $202_2$, $202_3$ circuitry can be considered to be the same circuitry (not illustrated) as BSC $212_1$, $212_2$, $212_3$ (it should be appreciated that a BSS comprises a BSC and a BTS according to well-known prior art, so when there is a discussion herein about a BSS performing certain functions, it typically means the BSC performing those functions unless it is specifically mentioned that the BTS is performing a function).

The CN node 207 (e.g., SGSN 207, Mobility Management Entity (MME) 207) may include a transceiver circuit 252 for communicating with the BSSs $202_1$, $202_2$, $202_3$, a processing circuit 254 for processing signals transmitted from and received by the transceiver circuit 252 and for controlling the operation of the CN node 207, and a network interface 257 for communicating with the PDN 219 or the server 213. The transceiver circuit 252 may include a transmitter 256 and a receiver 258, which may operate according to any standard, e.g., the GSM/EDGE standard (in this example), and the EC-GSM standard. The processing circuit 254 may include a processor 260 and a memory 262 for storing program code for controlling the operation of the CN node 207. The program code may include code for performing the procedures as described hereinafter.

Techniques for Acknowledging an Access Attempt for the MTA Procedure without Assigning Resources Brief Description In accordance with an embodiment of the present disclosure, an MS 204 that is enabled for PEO and capable of performing an MTA procedure using the Access Burst method receives an MTA request message for the MS to perform a radio access part of the MTA procedure. The MS 204 responds by transmitting, to a BSS $202_1$, a multilateration request message $270_1$ that indicates the Access Burst method for performing the MTA procedure. The MS 204 then receives, from the BSS $202_1$, an assignment message $274_1$ acknowledging that the BSS $202_1$ received the multilateration request message $270_1$ without assigning radio resources for the MS 204. As will be discussed further below, an 'assignment message $274_1$' can refer to an Immediate Assignment message or an EC Immediate Assignment Type 3 message, in accordance with various embodiments.

Alternatively, in another embodiment of the present disclosure, an MS 204 that is enabled for PEO and capable of performing an MTA procedure using the Access Burst method receives an MTA request message for the MS to perform a radio access part of the MTA procedure. The MS 204 responds by transmitting, to a BSS $202_1$, a multilateration request message $270_1$ that indicates the Access Burst method for performing the MTA procedure. However, in this embodiment, the MS 204 then receives, from the BSS $202_1$, a packet assignment message $275_1$ acknowledging that the BSS $202_1$ received the multilateration request message $270_1$ without assigning packet resources for the MS 204. As will be discussed further below, a 'packet assignment message $275_1$' refers to an Immediate Packet Assignment message, in accordance with various embodiments.

It is further proposed in yet another embodiment of the present disclosure, an MS 204 that is enabled for EC operation and capable of performing an MTA procedure using the Access Burst method receives an MTA request message for the MS to perform a radio access part of the MTA procedure. The MS 204 responds by transmitting to a BSS $202_1$, a multilateration request message $270_1$ that indicates the Access Burst method for performing the MTA procedure. The MS 204 then receives, from the BSS $202_1$, an assignment message $274_1$ acknowledging that the BSS $202_1$ received the multilateration request message $270_1$ without assigning radio resources for the MS 204.

In these embodiments, the MS 204 may determine if the received assignment message $274_1$ or the received packet assignment message $275_1$ matches the multilateration request message $270_1$ that the MS 204 transmitted to the BSS $202_1$. The MS 204 may do so by determining if a value of a Short ID field 276 included in the received assignment message $274_1$ or in the received packet assignment message $275_1$ matches a value of a Short ID field 272 included in the multilateration request message $270_1$ that the MS 204 transmitted to the BSS $202_1$. Thus, the MS 204 can receive acknowledgment from the BSS $202_1$ that the access attempt made by the MS 204 was successful without unnecessarily being assigned resources that the MS 204 does not need when performing the MTA procedure using the Access Burst method. These embodiments of the present disclosure will be discussed in more detail hereinafter.

DETAILED DESCRIPTION

As part of performing the radio access portion of the multilateration timing advance (MTA) procedure, when the MS 204 uses the Access Burst method in any given cell, the MS 204 needs to know whether or not its access burst has been successfully received by the serving BSS $202_1$, and as such the serving BSS $202_1$ needs to send the MS 204 some form of acknowledgement that confirms reception of the access burst without also assigning the MS 204 resources (e.g., packet resources, radio resources for an uplink Temporary Block Flow (TBF)), since no Radio Link Control (RLC) Data Block needs to be transmitted using the Access Burst method.

The legacy Immediate Assignment message is used to both acknowledge BSS reception of a specific access burst on the Random Access Channel (RACH) and to assign the corresponding MS radio resources for an uplink TBF and is therefore not suitable (as currently defined) for sending as an acknowledgement to an MS that has enabled Power Efficient Operation (PEO) and is performing the MTA procedure using the Access Burst method. Similarly, the legacy Extended Coverage (EC) Immediate Assignment Type 2 message is used to both acknowledge BSS reception of a specific set of access bursts on the EC-RACH and to assign the corresponding MS radio resources for an uplink TBF and is therefore not suitable (as currently defined) for sending as an acknowledgement to an MS that has enabled EC operation and is performing the MTA procedure using the Access Burst method.

Accordingly, the techniques disclosed herein allows an MS 204 to attempt system access for the purpose of performing the MTA procedure using the Access Burst method and to receive an acknowledgement that its access attempt has been successful without the MS 204 also being assigned radio resources for an uplink TBF. Techniques discussed below apply to mobile stations enabled for Power Efficient Operation (PEO) and to mobile stations enabled for Extended Coverage (EC) operation.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Embodiments below will be exemplified with GSM/EDGE as the communications network. The core network node will be exemplified with an SGSN, but generally it may be another core network node serving the communication device as well. For example, for NB-IoT the applicable core network node may also be an MME. The radio access network node (controller node) is exemplified with a BSS and the communication device will be exemplified with a mobile station, sometimes also referred to as the device. The positioning node will be exemplified with an SMLC node but may, e.g., for NB-IoT be an E-SMLC node.

It shall be noted to anyone skilled in the art that the principles described in the embodiments below also may also be applicable to other Radio Access technologies such as Long Term Evolution (LTE), Universal Mobile Telephony System (UMTS), Narrow Band Internet of Things (NB-IoT), and Enhanced Machine Type Communications (eMTC).

First Embodiment

In a first embodiment, an MS 204 is enabled for PEO and is using the Access Burst method to perform the MTA procedure. The MS 204 receives an MTA request message for the MS 204 to perform a radio access part of the MTA procedure. For example, the MTA request message can be a Radio Resource Location Services Protocol (RRLP) Multilateration Timing Advance Request message transmitted from the serving SMLC $206_1$ and received by the MS 204 via the serving BSS $202_1$. The MS 204 then starts to perform the radio access part of the MTA procedure by sending an access request (i.e., an access burst) on the RACH. The MS 204 sends the access request by transmitting, to the serving BSS $202_1$, a multilateration request message $270_1$ that indicates the Access Burst method for performing the MTA procedure. In some embodiments, the multilateration request message is an Enhanced General Packet Radio Service (EGPRS) Multilateration Request message. The MS 204 then receives, from the serving BSS $202_1$, an assignment message $274_1$ acknowledging that the serving BSS $202_1$ received the multilateration request message without assigning radio resources for the MS 204. In particular, the serving BSS $202_1$ can transmit to the MS 204 an Immediate Assignment message on the Access Grant Channel (AGCH), wherein the Immediate Assignment message is modified (relative to a legacy Immediate Assignment message) to exclude the inclusion of radio resources.

FIG. 3A illustrates details of a legacy Immediate Assignment message, as extracted from 3GPP TS 44.018. It is to be noted that FIGS. 3A-7B reference portions of 3GPP TS 44.018 in which tables, figures, details, codings, etc. have been extracted or are proposed for modification in various embodiments. The legacy Immediate Assignment message is sent by the network to the mobile station in idle mode to change the channel configuration to a dedicated configuration while staying in the same cell or to the mobile station in packet idle mode to change the channel configuration to either an uplink or a downlink packet data channel configuration. In an exemplary embodiment, the Immediate Assignment message will also be sent to the MS 204 in packet idle mode when it has enabled PEO and is performing the MTA procedure using the Access Burst method.

The Immediate Assignment message can be modified (relative to a legacy Immediate Assignment message) to exclude the inclusion of radio resources by modifying an Information Element (IE) 278 included therein. In one exemplary embodiment, the IE modified is the 'Dedicated mode or TBF' IE, which is highlighted with a dashed outline in FIG. 3A. Thus, the 'Dedicated mode or TBF' IE can be used to indicate that no TBF resources are assigned to the MS 204.

FIGS. 3B-3D illustrate details of the 'Dedicated mode or TBF' IE in accordance with an embodiment of the present disclosure. The legacy 'Dedicated mode or TBF' IE was used by the network to indicate to the MS whether the rest of the message shall be decoded as an Immediate Assignment message allocating a channel in dedicated mode or whether the rest of the message shall be decoded as the allocation of a TBF. As modified, the 'Dedicated mode or TBF' IE can also be used to indicate that no Temporary Block Flow is allocated, for example, when the Immediate Assignment message is sent in response to the EGPRS Multilateration Request message indicating the Access Burst method for the MTA procedure. FIG. 3B illustrates fields of the modified 'Dedicated mode or TBF' IE. In particular, a previously spare bit is modified, labeled as the (No TBF Allocated) NTA field 310, to indicate that no TBF resources are assigned to the MS 204. As explained in FIG. 3C, which details fields of the 'Dedicated mode or TBF' IE, the NTA field 310 is used to indicate when no TBF is allocated by the Immediate Assignment message. If the NTA field 310 is set to '1' the MS 204 shall ignore the contents of 'Channel Description' IE, 'Packet Channel Description' IE, 'Timing Advance' IE, 'Mobile Allocation' IE, 'Starting Time' IE, 'Immediate Assignment (IA) Rest Octets' IE and 'Extended TSC Set' IE if included in the Immediate Assignment message. FIG. 3D illustrates one possible coding 320 of the NTA field 310. As illustrated, the serving BSS $202_1$ sets the value of the NTA field 310 to '1' when transmitting the Immediate Assignment in response to receiving an EGPRS Multilateration Request message indicating the Access Burst method. It is to be noted that, although the modified previously spare bit is labeled as NTA in the figures, embodiments of the application and their equivalents are not so limited.

Upon receipt of the assignment message, the MS 204 can determine that a value of the IE 278 indicates that no TBF resources are assigned to the MS 204. For example, when the MS 204 receives the Immediate Assignment message, the MS 204 determines that the value of the 'Dedicated mode or TBF' IE being set to '1' indicates that no TBF resources are assigned to the MS 204. The MS 204 can then determine if the assignment message $274_1$ matches a multilateration request message $270_1$ (e.g., one of the last three EGPRS Multilateration Request messages) that the MS 204 transmitted to the serving BSS $202_1$.

The use of the legacy type Immediate Assignment message is preferred for acknowledging the MS's access attempt since legacy MSs (e.g., MSs that are not capable of performing the MTA procedure) will understand the content of this message and therefore be able to detect the presence of an implicit reject indication therein. It should be noted that other MSs attempting system access but not performing the MTA procedure using the Access Burst method may also be looking for a matching Immediate Assignment message during the same general time interval as MSs performing the MTA procedure using the Access Burst method. An MTA-capable MS that is attempting system access for a purpose other than for performing the MTA procedure using the Access Burst method will interpret the value of the NTA field 310 in the 'Dedicated mode or TBF' IE being set to 1 as meaning the corresponding Immediate Assignment message only confirms reception of one or more access requests sent by MSs using the Access Burst method (i.e., no uplink TBF resources are assigned). However, a legacy MS that is not MTA-capable and is attempting system access cannot be expected to interpret the value of the NTA field 310 in the 'Dedicated mode or TBF' IE being set to 1 as meaning it should not further examine the Immediate Assignment message. Upon receiving an Immediate Assignment message in which the value of the NTA field 310 in the 'Dedicated mode or TBF' IE is set to 1, a legacy MS that does not support MTA will therefore expect a subset of IEs (after the 'Dedicated mode or TBF' IE) that will necessarily include the 'Request Reference' IE as illustrated in FIG. 3A.

Option 1

Accordingly, in an exemplary embodiment (referred to in the figures as 'option 1'), to ensure that such a legacy MS never interprets an Immediate Assignment message sent to the MS 204 performing the MTA procedure (using the Access Burst method) as matching a previously transmitted EGPRS Packet Channel Request message, the serving BSS $202_1$ can exclude the 'Packet Channel Description' IE and the 'Channel Description' IE in the Immediate Assignment message whenever it is being sent in response to an MS attempting system access for performing the MTA procedure using the Access Burst method. The absence of the legacy 'Packet Channel Description' IE in the received Immediate Assignment message means that the legacy MS will not be able to detect the presence of the 'Packet Channel Description' IE in that message and will simply be unable to act on the message even if the legacy MS interprets the 'Request Reference' IE therein as corresponding to (i.e., matching) its attempted system access.

FIG. 3F illustrates exclusion of the 'Packet Channel Description' IE and the 'Channel Description' IE and inclusion of a set of IEs in an Immediate Assignment message sent by the serving BSS $202_1$ in response to the MS 204 attempting system access for performing the MTA procedure using the Access Burst method. FIG. 3E is a diagram illustrating one possible coding 330 of the 'Immediate Assignment (IA) Rest Octets' IE to keep the Immediate Assignment message as small as possible, where the 'IA Rest Octets' IE is coded using the 'LH' and 'reserved for future use' options. Due to the inclusion of the 'IA Rest Octets' IE in the Immediate Assignment message, a legacy MS will still be able to determine if the serving BSS $202_1$ has enabled the Implicit Reject feature for the Packet Switched (PS) domain and act accordingly. In other words, the re-use of the legacy Immediate Assignment message is advantageous since, if a new type of Immediate Assignment message was defined instead for sending a response to MS 204 attempting system access for performing the MTA procedure using the Access Burst method, then the new message would not be recognized by legacy MSs and therefore could not be used to provide legacy MSs with an Implicit Reject indication, thereby reducing the efficiency and precision with which the serving BSS $202_1$ can manage the Implicit Reject feature.

The Immediate Assignment message further includes a 'Request Reference' IE. In this case, the Random Access Information included in (e.g., octet 2 of) the 'Request Reference' IE will be coded as the 8 least significant bits of the corresponding EGPRS Multilateration Request message (i.e., it will echo the 8 bit Short ID field included in the EGPRS Multilateration Request message transmitted by the MS 204 when the MTA procedure is performed using the Access Burst method). The Immediate Assignment message (as illustrated in FIG. 3F) can further include optional instances of the 'Request Reference' IE, thereby allowing the serving BSS $202_1$ to address multiple MSs (using the Access Burst method) within a single Immediate Assignment message.

Referring to the discussion above, upon the MS 204 determining that a value of the IE 272 indicates that no TBF resources are assigned to the MS 204, the MS 204 can determine if the assignment message $274_1$ matches a multilateration request message $270_1$ (e.g., one of the last three EGPRS Multilateration Request messages) that the MS 204 transmitted to the serving BSS $202_1$. In some embodiments, a determination of a match in the messages is made by determining if a Short ID field 276 value included in another IE of the assignment message $274_1$ matches a value of a Short ID field 272 included in the multilateration request message $270_1$. In option 2 discussed above with reference to FIGS. 3E-3F, the Random Access Information included in the 'Request Reference' IE will be coded as the 8 least significant bits of the corresponding EGPRS Multilateration Request message. That is, the serving BSS $202_1$ will set a value of a field in the 'Request Reference' IE to the 8 bit Short ID field (i.e., the 8 least significant bits) of an EGPRS Multilateration Request message to which it is responding. Moreover, the 'Request Reference' IE may be one of multiple 'Request Reference' IEs of the Immediate Assignment message allowing the serving BSS $202_1$ to address, within the single Immediate Assignment message, multiple MSs performing the MTA procedure using the Access Burst method. This allows those MSs to also determine matches between the single Immediate Assignment message and previous multilateration request messages that they sent.

On receipt of the Immediate Assignment message corresponding to one of its three last EGPRS Multilateration Request messages (when the Access Burst method is used), the MS 204 stops sending EGPRS Multilateration Request messages and considers the MTA procedure as successfully completed in the current cell, tunes to the next cell in the list of applicable cells, and performs the MTA procedure therein.

Option 2

Alternatively, in another embodiment (referred to in the figures as 'option 2'), the serving BSS $202_1$ excludes the 'Channel Description' IE in the Immediate Assignment message whenever it is being sent in response to an MS attempting system access for performing the MTA procedure using the Access Burst method. This option is similar to option 1 discussed above, except that the legacy 'Packet Channel Description' IE is included in an Immediate Assignment message sent to the MS 204. This will eliminate the possibility of legacy MSs rejecting an Immediate Assignment message that excludes both the legacy 'Channel Description' IE and 'Packet Channel Description' IE.

FIG. 3G illustrates exclusion of the 'Channel Description' IE and inclusion of a set of IEs in an Immediate Assignment message sent by the serving BSS $202_1$ in response to the MS 204 attempting system access for performing the MTA procedure using the Access Burst method. For option 2, as with option 1, optional instances of the 'Request Reference' IE can be supported in the Immediate Assignment message, thereby allowing the serving BSS $202_1$ BSS to address multiple MSs using the Access Burst method within a single Immediate Assignment message. The Random Access Information included in (e.g., octet 2 of) the 'Request Reference' IE will be coded as the 8 least significant bits of the corresponding EGPRS Multilateration Request message (i.e., it will echo the 8 bit Short ID field included in the EGPRS Multilateration Request message when the MTA procedure is performed using the Access Burst method). For option 2, just as with option 1, the 'IA Rest Octets' IE can be coded using the 'LH' and 'reserved for future use' options, as illustrated in FIG. 3E, to keep the Immediate Assignment message as small as possible. By using the 'LH' and 'reserved for future use' options for encoding the 'IA Rest Octets' IE, a legacy MS (that is not MTA capable) will simply be unable to act on a received Immediate Assignment message (i.e., it will be missing mandatory parameters required for uplink TBF management) even if it interprets the 'Request Reference' IE therein as corresponding to (i.e., matching) its attempted system access.

Due to the inclusion of the 'IA Rest Octets' IE in the Immediate Assignment message, a legacy MS will still be able to determine if the serving BSS $202_1$ has enabled the Implicit Reject feature for the Packet Switched (PS) domain and act accordingly. In other words, the re-use of the legacy Immediate Assignment message is advantageous since, if a new type of Immediate Assignment message was defined instead for sending a response to MS 204 attempting system access for performing the MTA procedure using the Access Burst method, then the new message would not be recognized by legacy MSs and therefore could not be used to provide legacy MSs with an Implicit Reject indication, thereby reducing the efficiency and precision with which the serving BSS $202_1$ can manage the Implicit Reject feature.

Second Embodiment

In a second embodiment, an MS 204 is again enabled for PEO and is using the Access Burst method to perform the MTA procedure. In response to receiving an MTA request message, the MS 204 starts to perform the radio access part of the MTA procedure by sending an access request (i.e., an access burst). The MS 204 then receives an assignment message $274_1$ acknowledging that the serving BSS $202_1$ received the multilateration request message without assigning radio resources for the MS 204. In particular, the assignment message 274 is the Immediate Assignment message transmitted by the serving BSS $202_1$.

However, instead of using a previously unused spare bit (as illustrated in FIG. 3D) of an IE of the Immediate Assignment message as in the first embodiment, a previously unused code point in an IE carried within the legacy Immediate Assignment message is used to indicate that no TBF resources are assigned to the MS 204 in this second embodiment. In particular, a previously unused code point in the 'Dedicated mode or TBF' IE is used to indicate that no TBF resources are assigned. FIG. 4 illustrates details of a 'Dedicated mode or TBF' IE in accordance with this embodiment. The table of FIG. 4 is modified from the unmodified Table 10.5.2.25b.2 of 3GPP TS 44.018 illustrating coding for the 'Dedicated mode or TBF' IE, wherein code points 010, 100, and 110 (as coded for bit 3, bit 2, and bit 1 of octet 1) are unused. In this second embodiment, one of these already unused code points (e.g., the 010 code point 410) is used for the purpose of indicating to the MS 204 when no TBF is allocated by the Immediate Assignment message. As discussed above with respect to the first embodiment, utilization of this previously unused code points in the legacy Immediate Assignment message is preferred for acknowledging the MS's access attempt since legacy MSs (e.g., MSs that are not capable of performing the MTA procedure) will understand the content of this message and therefore be able to detect the presence of an implicit reject indication therein.

Third Embodiment

In a third embodiment, an MS 204 is again enabled for PEO and is using the Access Burst method to perform the MTA procedure. In response to receiving an MTA request message, the MS 204 starts to perform the radio access part of the MTA procedure by sending an access request (i.e., an access burst). The MS 204 then receives an assignment message $274_1$ acknowledging that the serving BSS $202_1$ received the multilateration request message without assigning radio resources for the MS 204. However, unlike in the above embodiments where the assignment message $274_1$ is a legacy Immediate Assignment message, in this third embodiment, a new dedicated Access Grant Channel (AGCH) message is introduced for the purpose of indicating to the MS 204 that its access burst has been received by the serving BSS $202_1$. In particular, a new Immediate Assignment Type 2 message or a new Immediate Assignment Reject message can be defined for 3GPP TS 44.018 to indicate that no TBF resources are assigned. In an exemplary embodiment, FIGS. 5A-5B illustrate details of a new Immediate Assignment Type 2 message and its 'Short ID' IE. The new message will only be understood by MSs that have enabled PEO when using the Access Burst method to perform the MTA procedure. The new message can contain multiple instances of MS specific reference information, wherein each instance is set according to the Short ID value included in an access request for which the serving BSS $202_1$ needs to send a corresponding response.

Fourth Embodiment

In a fourth embodiment, an MS 204 in packet idle mode is enabled for PEO and is using the Access Burst method to perform the MTA procedure. The MS 204 receives an MTA request message (e.g., RRLP Multilateration Timing Advance Request message transmitted from the serving SMLC $206_1$ and received via the serving BSS $202_1$) for the MS 204 to perform a radio access part of the MTA procedure. The MS 204 then starts to perform the radio access part of the MTA procedure by transmitting, to the serving BSS $202_1$, a multilateration request message $270_1$ (e.g., EGPRS Multilateration Request message) that indicates the Access Burst method for performing the MTA procedure. However, in this fourth embodiment, the MS 204 then receives, from the serving BSS $202_1$, a packet assignment message $275_1$ acknowledging that the serving BSS $202_1$ received the multilateration request message $270_1$ without assigning packet resources for the MS 204. In particular, the serving BSS $202_1$ can transmit to the MS 204 an Immediate Packet Assignment message, wherein the Immediate Packet Assignment message is modified (relative to a legacy Immediate Packet Assignment message) to exclude the inclusion of packet resources.

FIG. 6A illustrates contents of an Immediate Packet Assignment (IPA) message. In this fourth embodiment, the 'IPA Rest Octets' IE of the Immediate Packet Assignment message excludes packet resource assignment information. One possible coding 610 and details of the 'IPA Rest Octets' IE are illustrated in FIGS. 6B-6D. The 'IPA Rest Octets' IE of the Immediate Packet Assignment message is coded by the serving BSS $202_1$ to contain no radio resource assignments for the case where the message is sent in response to one or more EGPRS Multilateration Request messages indicating the Access Burst method is used. Upon receipt of the packet assignment message $275_1$, the MS 204 can determine that the message excludes packet resource assignment information, for example, by reading the message where it determines an IE of the message does not include packet resource information. In particular, the MS 204 reads the Immediate Packet Assignment message to determine that the 'IPA Rest Octets' IE does not include packet resource information. The MS 204 can then determine if the packet assignment message $275_1$ matches a multilateration request message $270_1$ (e.g., one of the last three EGPRS Multilateration Request messages) that the MS 204 transmitted to the serving BSS $202_1$.

In some embodiments, a determination of a match in the messages is made by determining if a value of a Short ID field 276 included in an IE of the packet assignment message $275_1$ matches a value of a Short ID field 272 included in the multilateration request message $270_1$. For the 'IPA Rest Octets' IE illustrated in FIGS. 6B-6D, to keep the Immediate Packet Assignment message as small as possible, the 'IPA Rest Octets' IE excludes packet resource assignment information and includes at least a Short ID 1 field. Thus, the MS 204 can determine if a value of the at least a Short ID 1 field included in the 'IPA Rest Octets' IE of the Immediate Packet Assignment message (as set by the serving BSS $202_1$) matches a value its Short ID field included in one of the last three EGPRS Multilateration Request messages that the MS 204 transmitted. That is, the MS 204 examines the values of the Short ID N fields (e.g., Short ID 1, Short ID 2, Short ID 3, and Short ID 4 illustrated in FIGS. 6B-6D) (as necessary) in an attempt to find an Immediate Packet Assignment message that matches its transmitted EGPRS Multilateration Request message (indicating the Access Burst method). Moreover, the multiple Short ID N fields allow multiple MSs using the Access Burst method to be addressed by the Immediate Packet Assignment message. In some embodiments, the Immediate Packet Assignment message may additionally include a 'Request Reference' IE (similar to that of the Immediate Assignment message in option 1 of embodiment 1 illustrated in FIG. 3F) to further allow the serving BSS $202_1$ to address with greater accuracy, within the single Immediate Packet Assignment message, multiple MSs performing the MTA procedure using the Access Burst method. The multiple Short ID N fields and any such 'Request Reference' IE would allow those MSs to also determine matches between the single Immediate Packet Assignment message and previous multilateration request messages that they sent. Because the 'Request Reference' IE identifies the time frame in which the BSS $202_1$ received a specific multilateration request message to which it is responding in the Immediate Packet Assignment message, an MS would be able to determine a match with greater accuracy.

With the exclusion of packet resource assignment information from the Immediate Packet Assignment message, a legacy MS (e.g., an MS that is not capable of performing the MTA procedure) will simply be unable to act on a received Immediate Packet Assignment message (i.e., it will be missing mandatory parameters required for uplink TBF management). Therefore, the legacy MS will never act on such an Immediate Packet Assignment message even if it interprets the message as corresponding to (i.e., matching) its attempted system access. However, the use of the legacy type Immediate Packet Assignment message is preferred for acknowledging the MS's 204 access attempt, because the legacy MS will be able to acquire Implicit Reject information since it is carried using the 'Feature Indicator' IE in the Immediate Packet Assignment message. Thus, a legacy MS will still be able to determine if the serving BSS $202_1$ has enabled the Implicit Reject feature for the Packet Switched (PS) domain and act accordingly. In other words, the re-use of the legacy Immediate Packet Assignment message is advantageous since, if a new type of Immediate Packet Assignment message was defined instead for sending a response to the MS 204 attempting system access for performing the MTA procedure using the Access Burst method, then the new message would not be recognized by legacy MSs and therefore could not be used to provide legacy MSs with an Implicit Reject indication (thereby reducing the efficiency and precision with which the serving BSS $202_1$ can manage the Implicit Reject feature). In some embodiments, an MS that has enabled PEO and is performing the MTA procedure using the RLC Data Block method shall ignore an Immediate Packet Assignment message that excludes packet resource assignment information.

On receipt of the Immediate Packet Assignment message corresponding to one of its three last EGPRS Multilateration Request messages (when the Access Burst method is used), the MS 204 stops sending EGPRS Multilateration Request messages and considers the MTA procedure as successfully completed in the current cell, tunes to the next cell in the list of applicable cells, and performs the MTA procedure therein.

Fifth Embodiment

In a fifth embodiment, an MS 204 is enabled for Extended Coverage (EC) operation and is using the Access Burst method to perform the MTA procedure. The MS 204 receives an MTA request message for the MS 204 to perform a radio access part of the MTA procedure. For example, the MTA request message can be a Radio Resource Location Services Protocol (RRLP) Multilateration Timing Advance Request message transmitted from the serving SMLC $206_1$ and received by the MS 204 via the serving BSS $202_1$. The MS 204 then starts to perform the radio access part of the MTA procedure by sending an access request (i.e., an access burst) on the Extended Coverage-Random Access Channel (EC-RACH). The MS 204 sends the access request by transmitting, to the serving BSS $202_1$, a multilateration request message $270_1$ that indicates the Access Burst method for performing the MTA procedure. In some embodiments, the multilateration request message is an EC Multilateration Request message. The MS 204 then receives, from the serving BSS $202_1$, an assignment message $274_1$ acknowledging that the serving BSS $202_1$ received the multilateration request message without assigning radio resources for the MS 204. In particular, the serving BSS $202_1$ can transmit to the MS 204 a new EC Immediate Assignment Type 3 message on the Extended Coverage-Access Grant Channel (EC-AGCH), wherein message excludes the inclusion of radio resources.

FIGS. 7A-7B illustrate one possible coding 710 and details of a new EC Immediate Assignment Type 3 message in accordance with this fifth embodiment. The new EC Immediate Assignment Type 3 message is defined for 3GPP TS 44.018 to indicate that no EC temporary block flow (TBF) resources are assigned. As defined, the EC Immediate Assignment Type 3 message does not have any option for including packet resource information. This new message will be understood by MSs that have enabled EC operation when using the Access Burst method to perform the MTA procedure.

Upon receipt of the assignment message $274_1$, the MS 204 can determine if the assignment message $274_1$ matches a multilateration request message $270_1$ (e.g., an EC Multilateration Request message) that the MS 204 transmitted to the serving BSS $202_1$. In some embodiments, a determination of a match in the messages is made by determining if a value of a Short ID field 276 included in the assignment message $274_1$ matches a value of a Short ID field 272 included in the multilateration request message $270_1$. The EC Immediate Assignment Type 3 message may contain multiple instances of MS specific reference information, wherein each instance is set according to the Short ID value included in an access request for which the serving BSS $202_1$ needs to send a corresponding response. Accordingly, as provided in the details of FIGS. 7A-7B, for an EC Immediate Assignment Type 3 message sent in response to the MS's 204 EC Multilateration Request message, the Short ID field identifies a cell specific 8 bit Short ID value used by the MS 204 performing the MTA procedure using the Access Burst method. Thus, the MS 204 is able to determine that the received assignment message $274_1$ matches its transmitted multilateration request message $270_1$. Further, the multiple instances of MS specific reference information (i.e., Short ID values) in the EC Immediate Assignment Type 3 message allow the serving BSS $202_1$ to address (i.e., to acknowledge access requests), within the single message, multiple MSs performing the MTA procedure using the Access Burst method.

On receipt of an EC Immediate Assignment Type 3 message corresponding to its last EC Multilateration Request message (when the Access Burst method is used), the MS 204 stops sending EC Multilateration Request messages, considers the MTA procedure as successfully completed in the current cell, tunes to the next cell in the list of applicable cells, and performs the MTA procedure therein.

Figure 8:
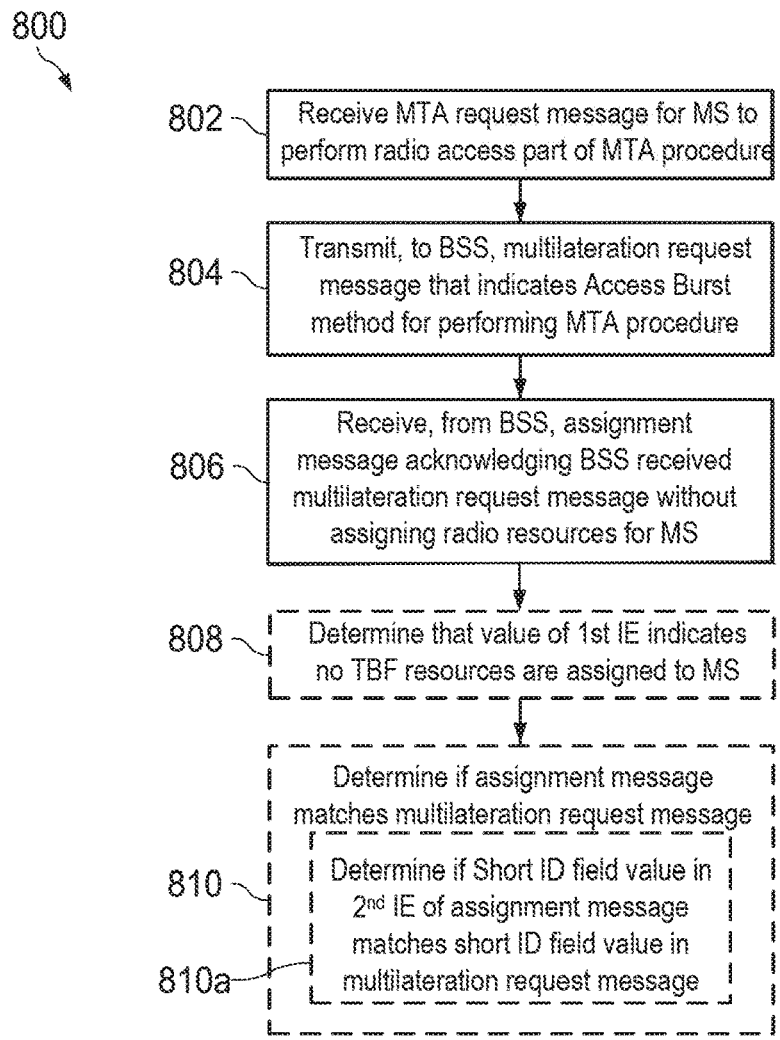
FIG. 8 is a flowchart of a method implemented in a mobile station enabled for PEO in accordance with embodiments of the present disclosure.

Basic Functionalities-Configurations of the MS 204 and the BSS 202$_1$, 202$_2$, 202$_3$ Referring to FIG. 8, there is a flowchart of a method 800 implemented in a mobile station 204 that is configured to interact with a BSS 202$_1$ (the serving BSS 202$_1$) in accordance with an embodiment of the present disclosure. The mobile station 204 is enabled for PEO and capable of performing an MTA procedure. At step 802, the mobile station 204 receives an MTA request message for the mobile station 204 to perform a radio access part of the MTA procedure (note: the serving SMLC 206$_1$ originally transmits the MTA request message, which is then transmitted by the BSS 202$_1$ to the mobile station 204). At step 804, the mobile station 204 transmits, to the BSS 202$_1$, a multilateration request message 270$_1$ that indicates an Access Burst method for performing the MTA procedure. At step 806, the mobile station 204 receives, from the BSS 202$_1$, an assignment message 274$_1$ acknowledging that the BSS 202$_1$ received the multilateration request message 270$_1$ without assigning radio resources for the mobile station 204. In some embodiments, the assignment message 274$_1$ includes a first IE 278 for indicating that no TBF resources are assigned to the mobile station 204. At step 808, the mobile station 204 can determine that a value of the first IE 278 indicates that no TBF resources are assigned to the mobile station 204. Upon such a determination, the mobile station 204 can (at step 810) determine if the assignment message 274$_1$ matches the multilateration request message 270$_1$ transmitted to the BSS 202$_1$. The determination of a match can be made, at step 810*a*, by the mobile station 204 determining if a value of a Short ID field 276 included in a second IE of the assignment message matches a value of a Short ID field 272 included in the multilateration request message 270$_1$. In some embodiments, the second IE of the assignment message 274$_1$ includes a plurality of Short ID field values allowing the BSS 202$_1$ to address, within the assignment message 274$_1$, a plurality of mobile stations performing the MTA procedure using the Access Burst method. In some embodiments, the assignment message 274$_1$ excludes a 'Channel Description' IE and a 'Packet Channel Description' IE such that a legacy mobile station that is incapable of performing the MTA procedure will not determine that the assignment message 274$_1$ matches a packet channel request message previously transmitted by the legacy mobile station. It should be appreciated that the mobile station 204 would also perform these steps with the other BSSs 202$_2$ and 202$_3$.

Figure 9:
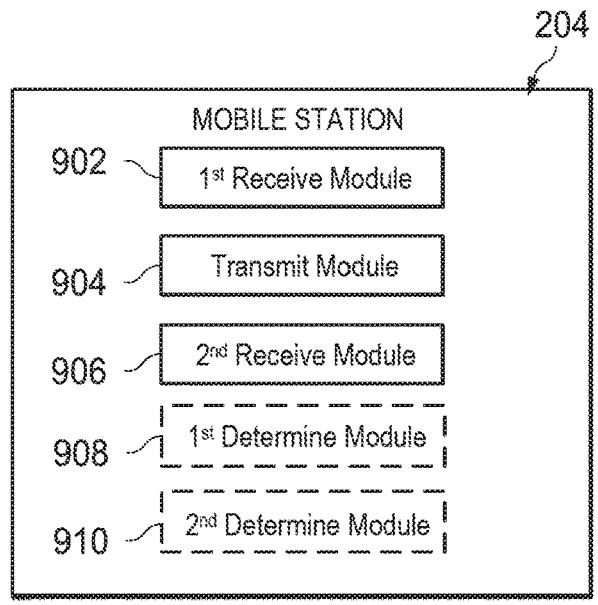
FIG. 9 is a block diagram illustrating structures of a mobile station enabled for PEO configured in accordance with embodiments of the present disclosure.

Referring to FIG. 9, there is a block diagram illustrating structures of an exemplary mobile station 204 in accordance with an embodiment of the present disclosure. The mobile station 204 is enabled for PEO and capable of performing an MTA procedure. In one embodiment, the mobile station 204 comprises a first receive module 902, a transmit module 904, a second receive module 906, an optional first determine module 908, and an optional second determine module 910. The first receive module 902 is configured to receive an MTA request message for the mobile station 204 to perform a radio access part of the MTA procedure. The transmit module 904 is configured to transmit, to the BSS 202$_1$, a multilateration request message 270$_1$ that indicates an Access Burst method for performing the MTA procedure. The second receive module 906 is configured to receive, from the BSS 202$_1$, an assignment message 274$_1$ acknowledging that the BSS 202$_1$ received the multilateration request message 270$_1$ without assigning radio resources for the mobile station 204. The optional first determine module 908 is configured to determine that a value of the first IE 278 indicates that no TBF resources are assigned to the mobile station 204. The optional second determine module 910 is configured to determine if the assignment message 274$_1$ matches the multilateration request message 270$_1$ transmitted to the BSS 202$_1$. For example, the optional second determine module 910 can be further configured to determine if a value of a Short ID field 276 included in a second IE of the assignment message matches a value of a Short ID field 272 included in the multilateration request message 270$_1$. It should be noted that the mobile station 204 may also include other components, modules or structures which are well-known, but for clarity, only the components, modules or structures needed to describe the features of the present disclosure are described herein.

As those skilled in the art will appreciate, the above-described modules 902, 904, 906, 908, and 910 of the mobile station 204 may be implemented separately as suitable dedicated circuits. Further, the modules 902, 904, 906, 908, and 910 can also be implemented using any number of dedicated circuits through functional combination or separation. In some embodiments, the modules 902, 904, 906, 908, and 910 may be even combined in a single application specific integrated circuit (ASIC). As an alternative software-based implementation, the mobile station 204 may comprise a memory 224, a processor 222 (including but not limited to a microprocessor, a microcontroller or a Digital Signal Processor (DSP), etc.) and a transceiver 214. The memory 224 stores machine-readable program code executable by the processor 222 to cause the mobile station 204 to perform the steps of the above-described method 800.

Figure 10:
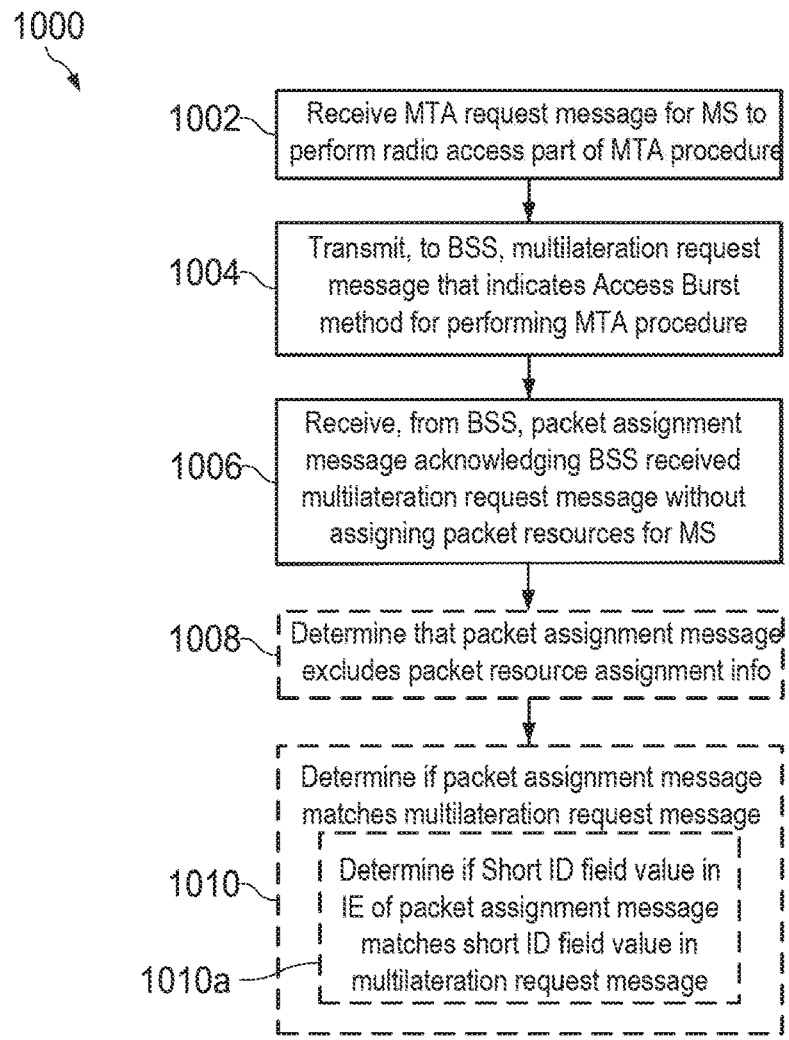
FIG. 10 is a flowchart of a method implemented in a mobile station enabled for PEO in accordance with embodiments of the present disclosure.

Referring to FIG. 10, there is a flowchart of a method 1000 implemented in a mobile station 204 that is configured to interact with a BSS 202$_1$ (the serving BSS 202$_1$) in accordance with an embodiment of the present disclosure. The mobile station 204 is enabled for PEO and capable of performing an MTA procedure. At step 1002, the mobile station 204 receives an MTA request message for the mobile station 204 to perform a radio access part of the MTA procedure (note: the serving SMLC 206$_1$ originally transmits the MTA request message, which is then transmitted by the BSS 202$_1$ to the mobile station 204). At step 1004, the mobile station 204 transmits, to the BSS 202$_1$, a multilateration request message 270$_1$ that indicates an Access Burst method for performing the MTA procedure. At step 1006, the mobile station 204 receives, from the BSS 202$_1$, a packet assignment message 275$_1$ acknowledging that the BSS 202$_1$ received the multilateration request message 270$_1$ without assigning packet resources for the mobile station 204. The packet assignment message 275$_1$ may exclude packet resource assignment information. At step 1008, the mobile station 204 can determine that the packet assignment message 275$_1$ excludes packet resource assignment information. Upon such a determination, the mobile station 204 can (at step 1010) determine if the packet assignment message 275$_1$ matches the multilateration request message 270$_1$ transmitted to the BSS 202$_1$. The determination of a match can be made, at step 1010*a*, by the mobile station 204 determining if a value of a Short ID field 276 included in an IE of the packet assignment message 275$_1$ matches a value of a Short ID field 272 included in the multilateration request message $270_1$. In some embodiments, the IE of the packet assignment message $275_1$ includes a plurality of Short ID field values allowing the BSS $202_1$ to address, within the packet assignment message $275_1$, a plurality of mobile stations performing the MTA procedure using the Access Burst method. It should be appreciated that the mobile station 204 would also perform these steps with the other BSSs $202_2$ and $202_3$.

Figure 11:
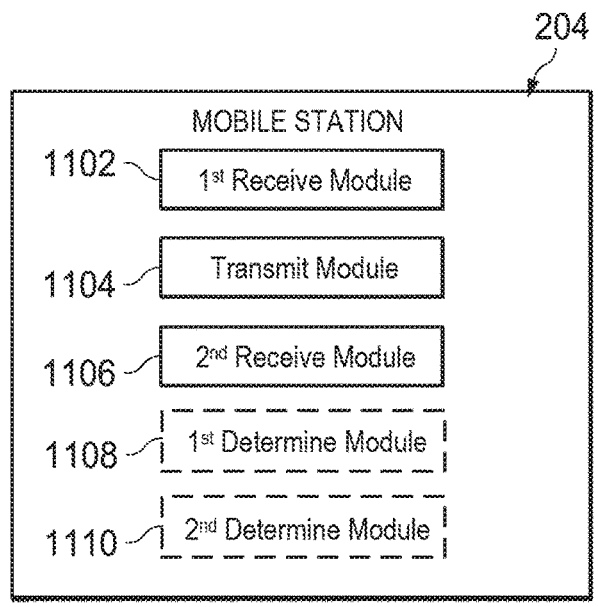
FIG. 11 is a block diagram illustrating structures of a mobile station enabled for PEO configured in accordance with embodiments of the present disclosure.

Referring to FIG. 11, there is a block diagram illustrating structures of an exemplary mobile station 204 in accordance with an embodiment of the present disclosure. The mobile station 204 is enabled for PEO and capable of performing an MTA procedure. In one embodiment, the mobile station 204 comprises a first receive module 1102, a transmit module 1104, a second receive module 1106, an optional first determine module 1108, and an optional second determine module 1110. The first receive module 1102 is configured to receive an MTA request message for the mobile station 204 to perform a radio access part of the MTA procedure. The transmit module 1104 is configured to transmit, to the BSS $202_1$, a multilateration request message $270_1$ that indicates an Access Burst method for performing the MTA procedure. The second receive module 1106 is configured to receive, from the BSS $202_1$, a packet assignment message $275_1$ acknowledging that the BSS $202_1$ received the multilateration request message $270_1$ without assigning packet resources for the mobile station 204. The optional first determine module 1108 is configured to determine that the packet assignment message $275_1$ excludes packet resource assignment information. The optional second determine module 1110 is configured to determine if the packet assignment message $275_1$ matches the multilateration request message $270_1$ transmitted to the BSS $202_1$. For example, the optional second determine module 1110 can be further configured to determine if a value of a Short ID field 276 included in an IE of the packet assignment message $275_1$ matches a value of a Short ID field 272 included in the multilateration request message $270_1$. It should be noted that the mobile station 204 may also include other components, modules or structures which are well-known, but for clarity, only the components, modules or structures needed to describe the features of the present disclosure are described herein.

As those skilled in the art will appreciate, the above-described modules 1102, 1104, 1106, 1108, and 1110 of the mobile station 204 may be implemented separately as suitable dedicated circuits. Further, the modules 1102, 1104, 1106, 1108, and 1110 can also be implemented using any number of dedicated circuits through functional combination or separation. In some embodiments, the modules 1102, 1104, 1106, 1108, and 1110 may be even combined in a single application specific integrated circuit (ASIC). As an alternative software-based implementation, the mobile station 204 may comprise a memory 224, a processor 222 (including but not limited to a microprocessor, a microcontroller or a Digital Signal Processor (DSP), etc.) and a transceiver 214. The memory 224 stores machine-readable program code executable by the processor 222 to cause the mobile station 204 to perform the steps of the above-described method 1000.

Figure 12:
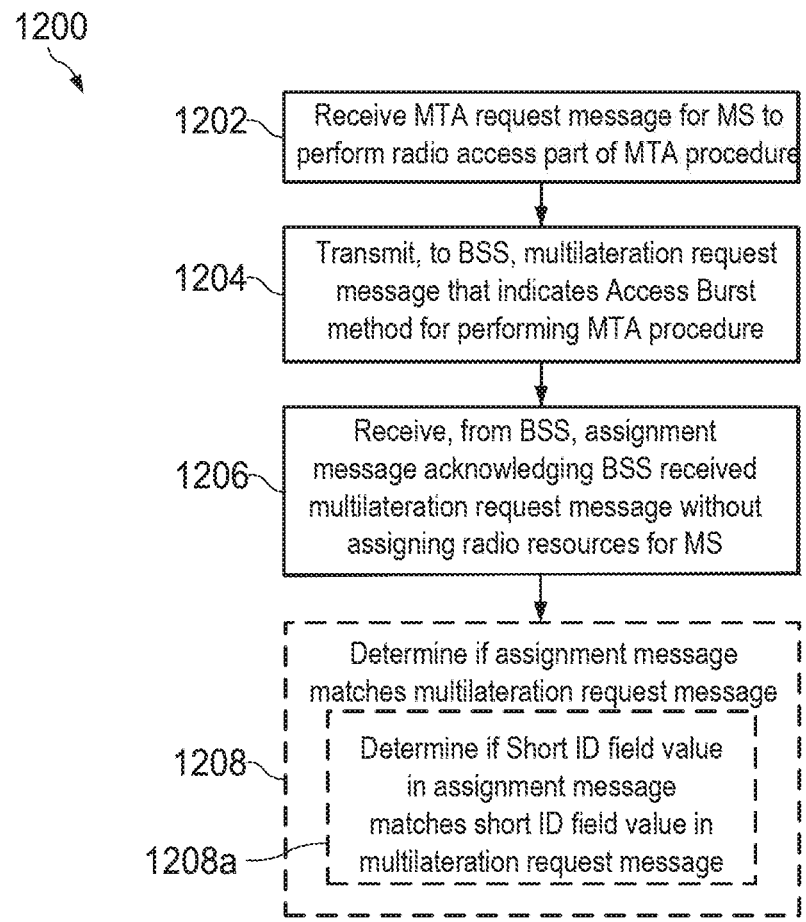
FIG. 12 is a flowchart of a method implemented in a mobile station enabled for EC operation in accordance with embodiments of the present disclosure.

Referring to FIG. 12, there is a flowchart of a method 1200 implemented in a mobile station 204 that is configured to interact with a BSS $202_1$ (the serving BSS $202_1$) in accordance with an embodiment of the present disclosure. The mobile station 204 is enabled for EC operation and capable of performing an MTA procedure. At step 1202, the mobile station 204 receives an MTA request message for the mobile station 204 to perform a radio access part of the MTA procedure (note: the serving SMLC $206_1$ originally transmits the MTA request message, which is then transmitted by the BSS $202_1$ to the mobile station 204). At step 1204, the mobile station 204 transmits, to the BSS $202_1$, a multilateration request message $270_1$ that indicates an Access Burst method for performing the MTA procedure. At step 1206, the mobile station 204 receives, from the BSS $202_1$, an assignment message $274_1$ acknowledging that the BSS $202_1$ received the multilateration request message $270_1$ without assigning radio resources for the mobile station 204. In some embodiments, the assignment message $274_1$ is an EC Immediate Assignment Type 3 message indicating that no TBF resources are assigned to the mobile station 204. At step 1208, the mobile station 204 can determine if the assignment message $274_1$ matches the multilateration request message $270_1$ transmitted to the BSS $202_1$. The determination of a match can be made, at step 1208a, by the mobile station 204 determining if a value of a Short ID field 276 included in the assignment message $274_1$ matches a value of a Short ID field 272 included in the multilateration request message $270_1$. In some embodiments, the assignment message $274_1$ includes a plurality of short ID field values allowing the BSS $202_1$ to address, within the assignment message $274_1$, a plurality of mobile stations performing the MTA procedure using the Access Burst method. It should be appreciated that the mobile station 204 would also perform these steps with the other BSSs $202_2$ and $202_3$.

Figure 13:
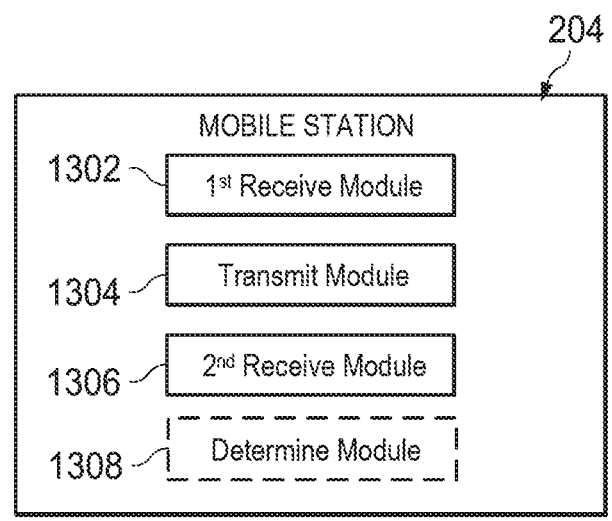
FIG. 13 is a block diagram illustrating structures of a mobile station enabled for EC operation configured in accordance with embodiments of the present disclosure.

Referring to FIG. 13, there is a block diagram illustrating structures of an exemplary mobile station 204 in accordance with an embodiment of the present disclosure. The mobile station 204 is enabled for EC operation and capable of performing an MTA procedure. In one embodiment, the mobile station 204 comprises a first receive module 1302, a transmit module 1304, a second receive module 1306, and an optional determine module 1308. The first receive module 1302 is configured to receive an MTA request message for the mobile station 204 to perform a radio access part of the MTA procedure. The transmit module 1304 is configured to transmit, to the BSS $202_1$, a multilateration request message $270_1$ that indicates an Access Burst method for performing the MTA procedure. The second receive module 1306 is configured to receive, from the BSS $202_1$, an assignment message $274_1$ acknowledging that the BSS $202_1$ received the multilateration request message $270_1$ without assigning radio resources for the mobile station 204. The optional determine module 1308 is configured to determine if the assignment message $274_1$ matches the multilateration request message $270_1$ transmitted to the BSS $202_1$. For example, the optional determine module 1308 can be further configured to determine if a value of a Short ID field 276 included in the assignment message $274_1$ matches a value of a Short ID field 272 included in the multilateration request message $270_1$. It should be noted that the mobile station 204 may also include other components, modules or structures which are well-known, but for clarity, only the components, modules or structures needed to describe the features of the present disclosure are described herein.

As those skilled in the art will appreciate, the above-described modules 1302, 1304, 1306, and 1308 of the mobile station 204 may be implemented separately as suitable dedicated circuits. Further, the modules 1302, 1304, 1306, and 1308 can also be implemented using any number of dedicated circuits through functional combination or separation. In some embodiments, the modules 1302, 1304, 1306, and 1308 may be even combined in a single application specific integrated circuit (ASIC). As an alternative software-based implementation, the mobile station 204 may comprise a memory 224, a processor 222 (including but not limited to a microprocessor, a microcontroller or a Digital Signal Processor (DSP), etc.) and a transceiver 214. The memory 224 stores machine-readable program code executable by the processor 222 to cause the mobile station 204 to perform the steps of the above-described method 1200.

Figure 14:
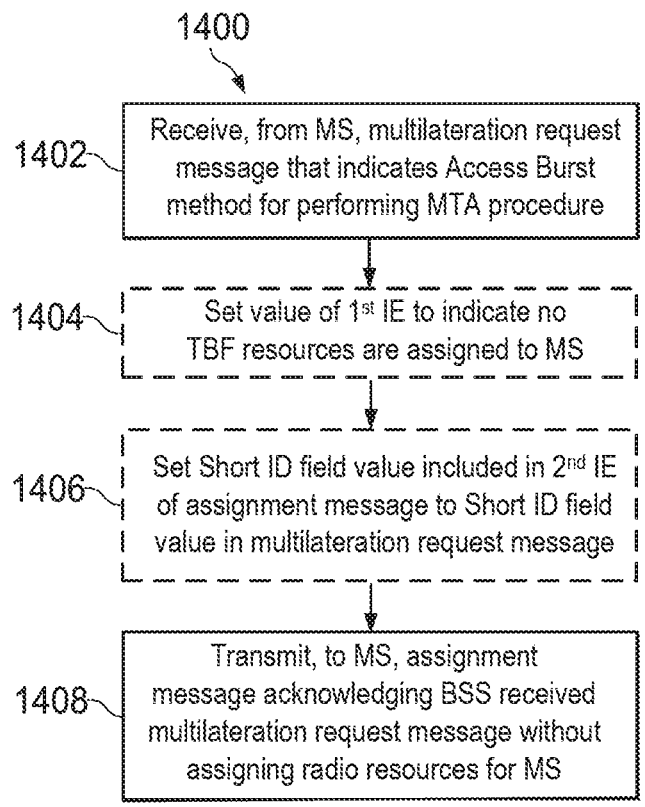
FIG. 14 is a flowchart of a method implemented in a BSS in accordance with embodiments of the present disclosure.

Referring to FIG. 14, there is a flowchart of a method 1400 implemented in a BSS $202_1$ (for example) configured to interact with mobile station 204 in accordance with an embodiment of the present disclosure. The mobile station 204 is enabled for PEO and capable of performing an MTA procedure. At step 1402, the BSS $202_1$ receives, from the mobile station 204, a multilateration request message $270_1$ that indicates an Access Burst method for performing the MTA procedure. At step 1404, the BSS $202_1$ can set a value of a first IE 278 included in an assignment message $274_1$ to indicate that no TBF resources are assigned to the mobile station 204. At step 1406, the BSS $202_1$ can set a value of a Short ID field 276 included in a second IE of the assignment message $274_1$ to a value of a Short ID field 272 included in the multilateration request message $270_1$. At step 1408, the BSS $202_1$ transmits, to the mobile station 204, the assignment message $274_1$ acknowledging that the BSS $202_1$ received the multilateration request message $270_1$ without assigning radio resources for the mobile station 204. In some embodiments, the assignment message $274_1$ includes the first IE 278 for indicating that no TBF resources are assigned to the mobile station 204. In some embodiments, the second IE of the assignment message $274_1$ includes a plurality of Short ID field values allowing the BSS $202_1$ to address, within the assignment message $274_1$, a plurality of mobile stations performing the MTA procedure using the Access Burst method. In some embodiments, the assignment message $274_1$ excludes a 'Channel Description' IE and a 'Packet Channel Description' IE such that a legacy mobile station that is incapable of performing the MTA procedure will not determine that the assignment message $274_1$ matches a packet channel request message previously transmitted by the legacy mobile station. It should be appreciated that the BSSs $202_2$ and $202_3$ would also perform these steps with the mobile station 204.

Figure 15:
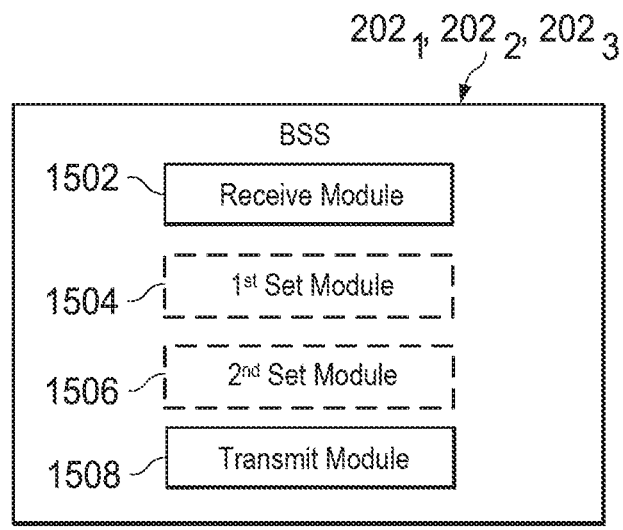
FIG. 15 is a block diagram illustrating structures of a BSS configured in accordance with embodiments of the present disclosure.

Referring to FIG. 15, there is a block diagram illustrating structures of an exemplary BSS $202_1$ (for example) in accordance with an embodiment of the present disclosure. The BSS $202_1$ is configured to interact with a mobile station 204 that is enabled for PEO and capable of performing an MTA procedure. In one embodiment, the BSS $202_1$ comprises a receive module 1502, an optional first set module 1504, an optional second set module 1506, and a transmit module 1508. The receive module 1502 is configured to receive, from the mobile station 204, a multilateration request message $270_1$ that indicates an Access Burst method for performing the MTA procedure. The optional first set module 1504 is configured to set a value of a first IE 278 included in an assignment message $274_1$ to indicate that no TBF resources are assigned to the mobile station 204. The optional second set module 1506 is configured to set a value of a Short ID field 276 included in a second IE of the assignment message $274_1$ to a value of a Short ID field 272 included in the multilateration request message $270_1$. The transmit module 1508 is configured to transmit, to the mobile station 204, the assignment message $274_1$ acknowledging that the BSS $202_1$ received the multilateration request message $270_1$ without assigning radio resources for the mobile station 204. It should be noted that the BSS $202_1$ may also include other components, modules or structures which are well-known, but for clarity, only the components, modules or structures needed to describe the features of the present disclosure are described herein.

As those skilled in the art will appreciate, the above-described modules 1502, 1504, 1506, and 1508 of the BSS $202_1$ may be implemented separately as suitable dedicated circuits. Further, the modules 1502, 1504, 1506, and 1508 can also be implemented using any number of dedicated circuits through functional combination or separation. In some embodiments, the modules 1502, 1504, 1506, and 1508 may be even combined in a single application specific integrated circuit (ASIC). As an alternative software-based implementation, the BSS $202_1$ may comprise a memory $250_1$, a processor $248_1$ (including but not limited to a microprocessor, a microcontroller or a Digital Signal Processor (DSP), etc.) and a transceiver $238_1$. The memory $250_1$ stores machine-readable program code executable by the processor $248_1$ to cause the BSS $202_1$ to perform the steps of the above-described method 1400. It is to be noted that the other BSSs $202_2$ and $202_3$ may be configured the same as BSS $202_1$.

Figure 16:
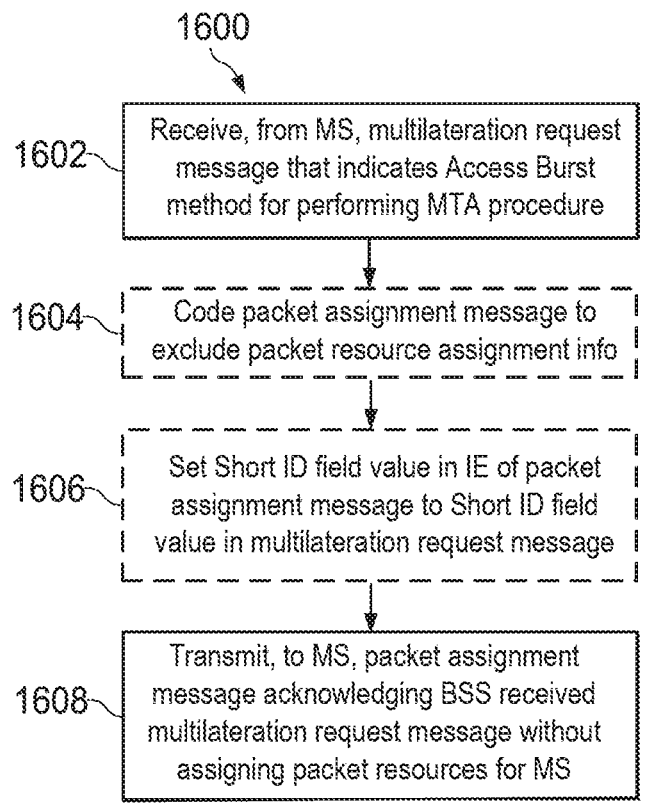
FIG. 16 is a flowchart of a method implemented in a BSS in accordance with embodiments of the present disclosure.

Referring to FIG. 16, there is a flowchart of a method 1600 implemented in a BSS $202_1$ (for example) configured to interact with mobile station 204 in accordance with an embodiment of the present disclosure. The mobile station 204 is enabled for PEO and capable of performing an MTA procedure. At step 1602, the BSS $202_1$ receives, from the mobile station 204, a multilateration request message $270_1$ that indicates an Access Burst method for performing the MTA procedure. At step 1604, the BSS $202_1$ can code a packet assignment message $275_1$ to exclude packet resource assignment information. At step 1606, the BSS $202_1$ can set a value of a Short ID field 276 included in an IE of the packet assignment message $275_1$ to a value of a Short ID field 272 included in the multilateration request message $270_1$. At step 1608, the BSS $202_1$ transmits, to the mobile station 204, the packet assignment message $275_1$ acknowledging that the BSS $202_1$ received the multilateration request message $270_1$ without assigning packet resources for the mobile station 204. In some embodiments, the packet assignment message $275_1$ excludes packet resource assignment information. In some embodiments, the IE of the packet assignment message $275_1$ includes a plurality of Short ID field values allowing the BSS $202_1$ to address, within the packet assignment message $275_1$, a plurality of mobile stations performing the MTA procedure using the Access Burst method. It should be appreciated that the BSSs $202_2$ and $202_3$ would also perform these steps with the mobile station 204.

Figure 17:
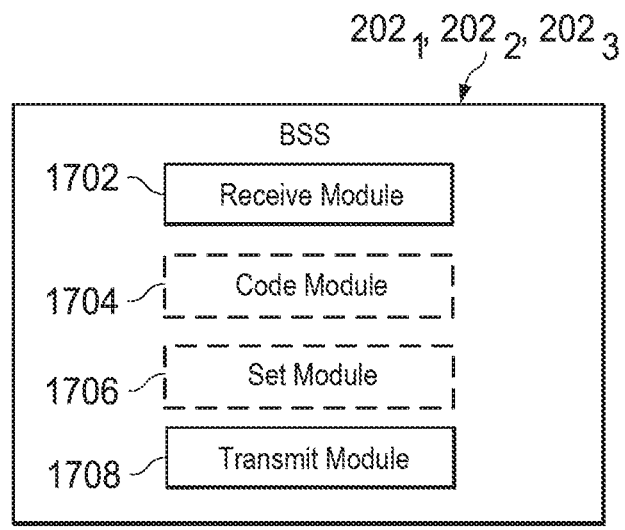
FIG. 17 is a block diagram illustrating structures of a BSS configured in accordance with embodiments of the present disclosure.

Referring to FIG. 17, there is a block diagram illustrating structures of an exemplary BSS $202_1$ (for example) in accordance with an embodiment of the present disclosure. The BSS $202_1$ is configured to interact with a mobile station 204 that is enabled for PEO and capable of performing an MTA procedure. In one embodiment, the BSS $202_1$ comprises a receive module 1702, an optional code module 1704, an optional set module 1706, and a transmit module 1708. The receive module 1702 is configured to receive, from the mobile station 204, a multilateration request message $270_1$ that indicates an Access Burst method for performing the MTA procedure. The optional code module 1704 is configured to code a packet assignment message $275_1$ to exclude packet resource assignment information. The optional set module 1706 is configured to set a value of a Short ID field 276 included in an IE of the packet assignment message $275_1$ to a value of a Short ID field 272 included in the multilateration request message $270_1$. The transmit module 1708 is configured to transmit, to the mobile station 204, the packet assignment message 275₁ acknowledging that the BSS 202₁ received the multilateration request message 270₁ without assigning packet resources for the mobile station 204. It should be noted that the BSS 202₁ may also include other components, modules or structures which are well-known, but for clarity, only the components, modules or structures needed to describe the features of the present disclosure are described herein.

As those skilled in the art will appreciate, the above-described modules 1702, 1704, 1706, and 1708 of the BSS 202₁ may be implemented separately as suitable dedicated circuits. Further, the modules 1702, 1704, 1706, and 1708 can also be implemented using any number of dedicated circuits through functional combination or separation. In some embodiments, the modules 1702, 1704, 1706, and 1708 may be even combined in a single application specific integrated circuit (ASIC). As an alternative software-based implementation, the BSS 202₁ may comprise a memory 250₁, a processor 248₁ (including but not limited to a microprocessor, a microcontroller or a Digital Signal Processor (DSP), etc.) and a transceiver 238₁. The memory 250₁ stores machine-readable program code executable by the processor 248₁ to cause the BSS 202₁ to perform the steps of the above-described method 1600. It is to be noted that the other BSSs 202₂ and 202₃ may be configured the same as BSS 202₁.

Figure 18:
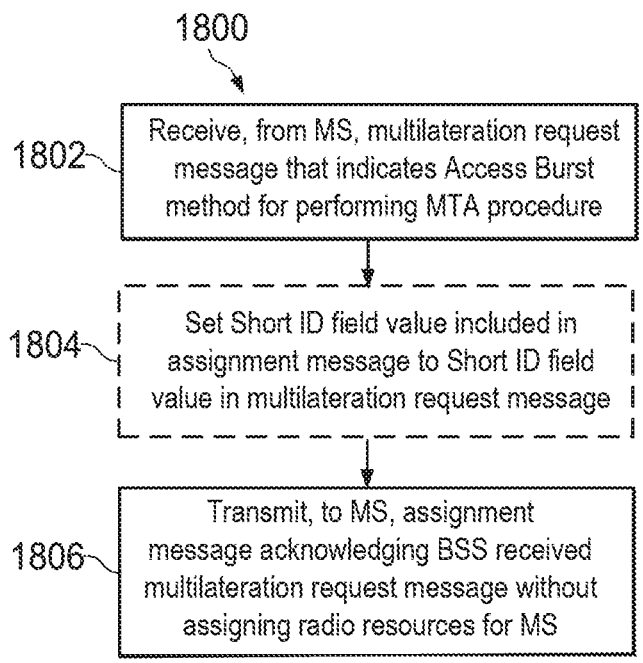
FIG. 18 is a flowchart of a method implemented in a BSS in accordance with embodiments of the present disclosure.

Referring to FIG. 18, there is a flowchart of a method 1800 implemented in a BSS 202₁ (for example) configured to interact with mobile station 204 in accordance with an embodiment of the present disclosure. The mobile station 204 is enabled for EC operation and capable of performing an MTA procedure. At step 1802, the BSS 202₁ receives, from the mobile station 204, a multilateration request message 270₁ that indicates an Access Burst method for performing the MTA procedure. At step 1804, the BSS 202₁ can set a value of a Short ID field 276 included in an assignment message 274₁ to a value of a Short ID field 272 included in the multilateration request message 270₁. At step 1806, the BSS 202₁ transmits, to the mobile station 204, the assignment message 274₁ acknowledging that the BSS 202₁ received the multilateration request message 270₁ without assigning radio resources for the mobile station 204. In some embodiments, the assignment message 274₁ is an EC Immediate Assignment Type 3 message indicating that no TBF resources are assigned to the mobile station 204. In some embodiments, the assignment message 274₁ includes a plurality of short ID field values allowing the BSS 202₁ to address, within the assignment message 274₁, a plurality of mobile stations performing the MTA procedure using the Access Burst method. It should be appreciated that the BSSs 202₂ and 202₃ would also perform these steps with the mobile station 204.

Figure 19:
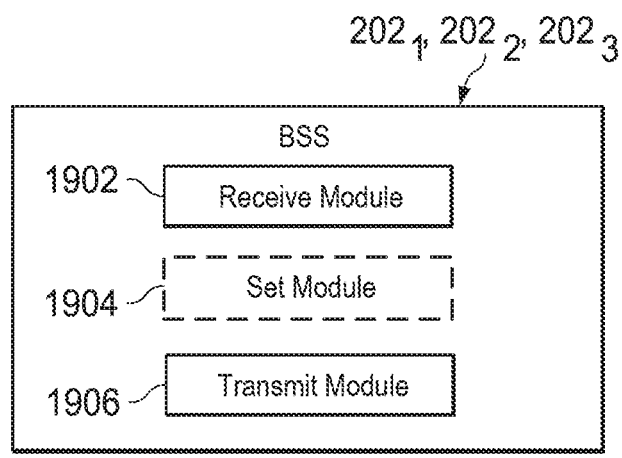
FIG. 19 is a block diagram illustrating structures of a BSS configured in accordance with embodiments of the present disclosure.

Referring to FIG. 19, there is a block diagram illustrating structures of an exemplary BSS 202₁ (for example) in accordance with an embodiment of the present disclosure. The BSS 202₁ is configured to interact with a mobile station 204 that is enabled for EC operation and capable of performing an MTA procedure. In one embodiment, the BSS 202₁ comprises a receive module 1902, an optional set module 1904, and a transmit module 1906. The receive module 1902 is configured to receive, from the mobile station 204, a multilateration request message 270₁ that indicates an Access Burst method for performing the MTA procedure. The optional set module 1904 is configured to set a value of a Short ID field 276 included in an assignment message 274₁ to a value of a Short ID field 272 included in the multilateration request message 270₁. The transmit module 1906 is configured to transmit, to the mobile station 204, the assignment message 274₁ acknowledging that the BSS 202₁ received the multilateration request message 270₁ without assigning radio resources for the mobile station 204. It should be noted that the BSS 202₁ may also include other components, modules or structures which are well-known, but for clarity, only the components, modules or structures needed to describe the features of the present disclosure are described herein.

As those skilled in the art will appreciate, the above-described modules 1902, 1904, and 1906 of the BSS 202₁ may be implemented separately as suitable dedicated circuits. Further, the modules 1902, 1904, and 1906 can also be implemented using any number of dedicated circuits through functional combination or separation. In some embodiments, the modules 1902, 1904, and 1906 may be even combined in a single application specific integrated circuit (ASIC). As an alternative software-based implementation, the BSS 202₁ may comprise a memory 250₁, a processor 248₁ (including but not limited to a microprocessor, a microcontroller or a Digital Signal Processor (DSP), etc.) and a transceiver 238₁. The memory 250₁ stores machine-readable program code executable by the processor 248₁ to cause the BSS 202₁ to perform the steps of the above-described method 1800. It is to be noted that the other BSSs 202₂ and 202₃ may be configured the same as BSS 202₁.

In view of the foregoing disclosure, it will be readily appreciated that it is beneficial for a BSS to be able to send confirmation of an access attempt to an MS, either enabled for PEO or EC operation, that attempts system access for the purpose of performing the MTA procedure using the Access Burst method without also unnecessarily assigning radio resources to the MS, which is not needed when using the Access Burst method. Further, the disclosed techniques provide multiple instances of a 'Request Reference' IE to be included in the Immediate Assignment message or multiple instances of the 'Short ID' IE to be included in the Immediate Packet Assignment message, which allows multiple mobile stations using the Access Burst method to be addressed by a single instance of these messages. Moreover, a new EC Immediate Assignment Type 3 message is defined that can contain multiple instances of MS specific reference information, wherein each instance is set according to the Short ID value included in an access request for which the BSS needs to send a corresponding response. Accordingly, a BSS is able to address multiple mobile stations using the Access Burst method within a single new EC Immediate Assignment Type 3 message.

A legacy mobile station that is not MTA capable and attempting system access, upon receiving an Immediate Assignment message, an Immediate Packet Assignment message, or the new EC Immediate Assignment Type 3 message will be incapable of acting on the message even if it interprets the message as corresponding to (i.e., matching) its attempted system access. However, for the Immediate Assignment message and the Immediate Packet Assignment message, a legacy mobile station will still be able to determine if the BSS has enabled the Implicit Reject feature for the Packet Switched (PS) domain and act accordingly, which maintains the efficiency and precision with which the BSS can manage the Implicit Reject feature.

It should be appreciated that in the above described embodiments that these embodiments are exemplary and not mutually exclusive. For example, components from one embodiment may be tacitly assumed to be present in another embodiment and it will be obvious to a person skilled in the art how those components may be used in the other exemplary embodiments.

The exemplary embodiments described herein have been exemplified with Global System for Mobile telephony (GSM)/Enhanced Data rates for GSM Evolution (EDGE) as the communications network 600. The radio access network node 202₁ (controller node 202₁) has been exemplified herein as being a BSS 202₁ but generally the radio access network node 202₁ may be any type of radio access network node 202₁ that is serving the mobile station as well.

It should further be noted that, to anyone skilled in the art, there are several realizations of the embodiments described herein with principally equivalent functionality where e.g., the introduced fields, information elements, and messages may be longer or shorter or even omitted. In addition, it should be noted that field, information element, and message names may change during the course of the specification work, which implies the changed names shall be considered to be equivalent so long as the principal use/function remain the same.

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present disclosure may be carried out in other specific ways than those herein set forth without departing from the scope and essential characteristics of the invention. One or more of the specific processes discussed above may be carried out in a cellular phone or other communications transceiver comprising one or more appropriately configured processing circuits, which may in some embodiments be embodied in one or more application-specific integrated circuits (ASICs). In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

Although multiple embodiments of the present disclosure have been illustrated in the accompanying Drawings and described in the foregoing Detailed Description, it should be understood that the invention is not limited to the disclosed embodiments, but instead is also capable of numerous rearrangements, modifications and substitutions without departing from the present disclosure that as has been set forth and defined within the following claims.

The invention claimed is:

1. A mobile station configured to interact with a base station subsystem (BSS), the mobile station enabled for power efficient operation (PEO) and capable of performing a multilateration timing advance (MTA) procedure, the mobile station comprising:
   a processor; and,
   a memory that stores processor-executable instructions, wherein the processor interfaces with the memory to execute the processor-executable instructions, whereby the mobile station is operable to:
      receive an MTA request message for the mobile station to perform a radio access part of the MTA procedure;
      transmit, to the BSS, a multilateration request message that indicates an Access Burst method for performing the MTA procedure; and
      receive, from the BSS, an assignment message acknowledging that the BSS received the multilateration request message and including a first information element (IE) indicating that no Temporary Block Flow (TBF) resources are assigned to the mobile station; and
      determine if the assignment message matches the multilateration request message transmitted to the BSS.

2. The mobile station of claim 1, wherein the mobile station is further operable to:
   determine that a value of the first IE indicates that no TBF resources are assigned to the mobile station;
   wherein determining if the assignment message matches the multilateration request message is in response to determining that the value of the first IE indicates that no TBF resources are assigned to the mobile station.

3. The mobile station of claim 2, wherein the mobile station is further operable to determine if the assignment message matches the multilateration request message by determining if a Short ID field value included in a second IE of the assignment message matches a Short ID field value included in the multilateration request message.

4. The mobile station of claim 3, wherein the second IE of the assignment message includes a plurality of Short ID field values allowing the BSS to address, within the assignment message, a plurality of mobile stations performing the MTA procedure using the Access Burst method.

5. The mobile station of claim 1, wherein the assignment message excludes a 'Channel Description' IE and a 'Packet Channel Description' IE such that a legacy mobile station that is incapable of performing the MTA procedure will not determine that the assignment message matches a packet channel request message previously transmitted by the legacy mobile station.

6. A method in a mobile station configured to interact with a base station subsystem (BSS), the mobile station enabled for power efficient operation (PEO) and capable of performing a multilateration timing advance (MTA) procedure, the method comprising:
   receiving an MTA request message for the mobile station to perform a radio access part of the MTA procedure;
   transmitting, to the BSS, a multilateration request message that indicates an Access Burst method for performing the MTA procedure; and
   receiving, from the BSS, an assignment message acknowledging that the BSS received the multilateration request message and including a first information element (IE) indicating that no Temporary Block Flow (TBF) resources are assigned to the mobile station; and
   determining if the assignment message matches the multilateration request message transmitted to the BSS.

7. The method of claim 6, further comprising:
   determining that a value of the first IE indicates that no TBF resources are assigned to the mobile station;

wherein determining if the assignment message matches the multilateration request message is in response to determining that the value of the first IE indicates that no TBF resources are assigned to the mobile station.

8. The method of claim 7, wherein determining if the assignment message matches the multilateration request message comprises determining if a Short ID field value included in a second IE of the assignment message matches a Short ID field value included in the multilateration request message.

9. The method of claim 8, wherein the second IE of the assignment message includes a plurality of Short ID field values allowing the BSS to address, within the assignment message, a plurality of mobile stations performing the MTA procedure using the Access Burst method.

10. The method of claim 6, wherein the assignment message excludes a 'Channel Description' IE and a 'Packet Channel Description' IE such that a legacy mobile station that is incapable of performing the MTA procedure will not determine that the assignment message matches a packet channel request message previously transmitted by the legacy mobile station.

11. A Base Station Subsystem (BSS) configured to interact with a mobile station, the mobile station enabled for power efficient operation (PEO) and capable of performing a multilateration timing advance (MTA) procedure, the BSS comprising:
a processor; and,
a memory that stores processor-executable instructions, wherein the processor interfaces with the memory to execute the processor-executable instructions, whereby the BSS is operable to:
receive, from the mobile station, a multilateration request message that indicates an Access Burst method for performing the MTA procedure, the multilateration request message including a Short ID field value; and
transmit, to the mobile station, an assignment message acknowledging that the BSS received the multilateration request message, the assignment message including a first information element (IE) and a second IE, a value of the first IE indicating that no Temporary Block Flow (TBF) resources are assigned to the mobile station, the second IE including the Short ID field value of the multilateration request message.

12. The BSS of claim 11, wherein the BSS is further operable to:
set a Short ID field value included in the second IE to the Short ID field value included in the multilateration request message.

13. The BSS of claim 12, wherein the second IE of the assignment message includes a plurality of Short ID field values allowing the BSS to address, within the assignment message, a plurality of mobile stations performing the MTA procedure using the Access Burst method.

14. The BSS of claim 11, wherein the assignment message excludes a 'Channel Description' IE and a 'Packet Channel Description' IE such that a legacy mobile station that is incapable of performing the MTA procedure will not determine that the assignment message matches a packet channel request message previously transmitted by the legacy mobile station.

15. A method in a Base Station Subsystem (BSS) configured to interact with a mobile station, the mobile station enabled for power efficient operation (PEO) and capable of performing a multilateration timing advance (MTA) procedure, the method comprising:
receiving, from the mobile station, a multilateration request message that indicates an Access Burst method for performing the MTA procedure, the multilateration request message including a Short ID field value; and
transmitting, to the mobile station, an assignment message acknowledging that the BSS received the multilateration request message, the assignment message including a first information element (IE) and a second IE, a value of the first IE indicating that no Temporary Block Flow (TBF) resources are assigned to the mobile station, the second IE including the Short ID field value of the multilateration request message.

16. The method of claim 15, further comprising:
setting a Short ID field value included in the second IE to the Short ID field value included in the multilateration request message.

17. The method of claim 16, wherein the second IE of the assignment message includes a plurality of Short ID field values allowing the BSS to address, within the assignment message, a plurality of mobile stations performing the MTA procedure using the Access Burst method.

18. The method of claim 15, wherein the assignment message excludes a 'Channel Description' IE and a 'Packet Channel Description' IE such that a legacy mobile station that is incapable of performing the MTA procedure will not determine that the assignment message matches a packet channel request message previously transmitted by the legacy mobile station.

* * * * *